(12) United States Patent
Lee et al.

(10) Patent No.: US 8,351,413 B2
(45) Date of Patent: Jan. 8, 2013

(54) METHOD AND APPARATUS FOR GENERATING RANGING SIGNAL IN WIRELESS COMMUNICATION SYSTEM

(75) Inventors: Hyun Woo Lee, Seoul (KR); Han Gyu Cho, Seoul (KR); Jin Sam Kwak, Seoul (KR); Yeong Hyeon Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 12/859,723

(22) Filed: Aug. 19, 2010

(65) Prior Publication Data

US 2011/0044312 A1    Feb. 24, 2011

Related U.S. Application Data

(60) Provisional application No. 61/235,696, filed on Aug. 21, 2009.

(30) Foreign Application Priority Data

Jul. 29, 2010    (KR) .......................... 10-2010-0073457

(51) Int. Cl.
*H04B 7/208* (2006.01)
(52) U.S. Cl. ........................................ 370/344
(58) Field of Classification Search .................. 370/310, 370/328, 329, 343, 344
See application file for complete search history.

(56) References Cited

U.S. PATENT DOCUMENTS

| | | | | |
|---|---|---|---|---|
| 7,307,973 B2 * | 12/2007 | Song et al. | ...................... | 370/331 |
| 7,336,647 B2 * | 2/2008 | Muharemovic et al. | ....... | 370/350 |
| 7,742,392 B2 * | 6/2010 | Ge et al. | ........................ | 370/208 |
| 8,059,525 B2 * | 11/2011 | Koo et al. | ....................... | 370/208 |
| 8,107,428 B2 * | 1/2012 | Chong et al. | ................... | 370/329 |
| 8,121,203 B1 * | 2/2012 | Fitton et al. | .................... | 375/260 |
| 2006/0291372 A1 * | 12/2006 | Koo et al. | ...................... | 370/208 |
| 2007/0053465 A1 * | 3/2007 | Koo et al. | ...................... | 375/303 |
| 2007/0060180 A1 * | 3/2007 | Muharemovic et al. | ....... | 455/509 |
| 2010/0014476 A1 * | 1/2010 | Eun et al. | ....................... | 370/329 |
| 2010/0111017 A1 * | 5/2010 | Um et al. | ....................... | 370/329 |
| 2010/0157820 A1 * | 6/2010 | Cheng et al. | ................... | 370/252 |
| 2010/0157933 A1 * | 6/2010 | Park et al. | ....................... | 370/330 |
| 2010/0311431 A1 * | 12/2010 | Papasakellariou et al. | ... | 455/450 |
| 2011/0007627 A1 * | 1/2011 | Lee et al. | ....................... | 370/210 |
| 2011/0019622 A1 * | 1/2011 | Lee et al. | ....................... | 370/328 |

* cited by examiner

*Primary Examiner* — Chi Pham
*Assistant Examiner* — Robert Lopata
(74) *Attorney, Agent, or Firm* — Lee, Hong, Degerman, Kang & Waimey

(57) ABSTRACT

A method and apparatus of generating a ranging signal in a wireless communication system is provided. A mobile station (MS) generates a ranging code in which a covering code has been applied to each of a plurality of orthogonal frequency division multiple access (OFDMA) symbols, and maps the ranging code to a plurality of subcarriers constituting each of the OFDMA symbols. The ranging signal is generated by performing OFDMA modulation on each of the OFDMA symbols.

13 Claims, 21 Drawing Sheets

(a)

(b)

(a)

(b)

METHOD AND APPARATUS FOR GENERATING RANGING SIGNAL IN WIRELESS COMMUNICATION SYSTEM

CROSS-REFERENCE TO RELATED APPLICATIONS

Pursuant to 35 U.S.C. §120, this application claims the benefit of priority of US Provisional application No. 61/235,696, filed on Aug. 21, 2009, and pursuant to 35 U.S.C. §119(a), this application claims the benefit of earlier filing date and right of priority to Korean Patent application No. 10-2010-0073457, filed on Jul. 29, 2010, the contents of all of which are incorporated by reference herein in their entirety.

BACKGROUND OF THE INVENTION

1. Field of the Invention

The present invention relates to wireless communication and, more particularly, to a method and apparatus for generating a ranging signal in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

An uplink control channel can be defined for transmission of an uplink control signal. Examples of the uplink control channel are various such as a fast feedback channel, a hybrid automatic repeat request (HARQ) feedback channel, a sounding channel, a ranging channel, a bandwidth request channel, etc. The fast feedback channel carries feedback of a channel quality indicator (CQI) and/or multiple-input multiple-output (MIMO) information, and can be classified into a primary fast feedback channel and a secondary fast feedback channel. The HARQ feedback channel is a channel for transmitting an acknowledgement (ACK)/non-acknowledgement (NACK) signal as a response for data transmission. The sounding channel can be used as an uplink channel response for closed-loop MIMO transmission and uplink scheduling. The bandwidth request channel is a channel for requesting a radio resource for transmitting a control signal or uplink data to be transmitted by a mobile station (MS).

The ranging channel can be used for uplink synchronization. The ranging channel can be classified into a ranging channel for a non-synchronized MS and a ranging channel for a synchronized MS. The ranging channel for the non-synchronized MS can be used for ranging on a target base station (BS) during initial network entry and handover. In a subframe in which the ranging channel for the non-synchronized MS is to be transmitted, the MS may not transmit any uplink burst or uplink control channel. The ranging channel for the synchronized MS can be used for periodic ranging. An MS which has already been synchronized with the target BS can transmit a ranging signal for the synchronized MS.

A ranging preamble code can be transmitted through a ranging channel. A user equipment selects and generates one ranging preamble code of a set of available ranging preamble codes within a cell and transmits the selected ranging preamble code through a ranging channel. A base station detects a received ranging preamble code. It is therefore necessary to take the detection performance of a base station into consideration in generating a ranging preamble code.

Accordingly, there is a need for a method of generating a ranging signal in order to improve the detection performance of a base station.

SUMMARY OF THE INVENTION

The present invention provides a method and apparatus for generating a ranging signal in a wireless communication system.

In an aspect, a method of generating a ranging signal in a wireless communication system is provided. The method include generating a ranging code in which a covering code has been applied to each of a plurality of orthogonal frequency division multiple access (OFDMA) symbols, mapping the ranging code to a plurality of subcarriers constituting each of the OFDMA symbols, and generating the ranging signal by performing OFDMA modulation on each of the OFDMA symbols. The ranging code may be generated by multiplying a ranging preamble code by the covering code in a time domain or a frequency domain. The covering code may be one of a discrete Fourier transform (DFT) code or a Walsh code. The covering code may have a length of 2. The covering code may be either [1 1] or [1 −1]. The covering code may be repeatedly applied to the plurality of OFDMA symbols. A number of the plurality of OFDMA symbols may be 6. The ranging code may have a length of 72. The OFDMA modulation may be performed on all the plurality of OFDMA symbols or may be performed on OFDMA symbols having an identical number with a length of the covering code and repeated.

In another aspect, an apparatus for transmitting a ranging signal in a wireless communication system is provided. The apparatus include a radio frequency (RF) unit configured to transmit or receive a radio signal and transmit the ranging signal, and a processor coupled to the RF unit, and configured to generate a ranging code in which a covering code has been applied to each of a plurality of OFDMA symbols, map the ranging code to a plurality of subcarriers constituting each of the OFDMA symbols, and generate the ranging signal by performing OFDMA modulation on each of the OFDMA symbols. The ranging code may be generated by multiplying a ranging preamble code by the covering code in a time domain or a frequency domain. The covering code may have a length of 2. The covering code may be either [1 1] or [1 −1]. The covering code may be repeatedly applied to the plurality of OFDMA symbols. A number of the plurality of OFDMA symbols may be 6.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11 (Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LET) is part of evolved UMTS (E-UMTS) using evolved-UMTS terrestrial radio access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

Figure 1:
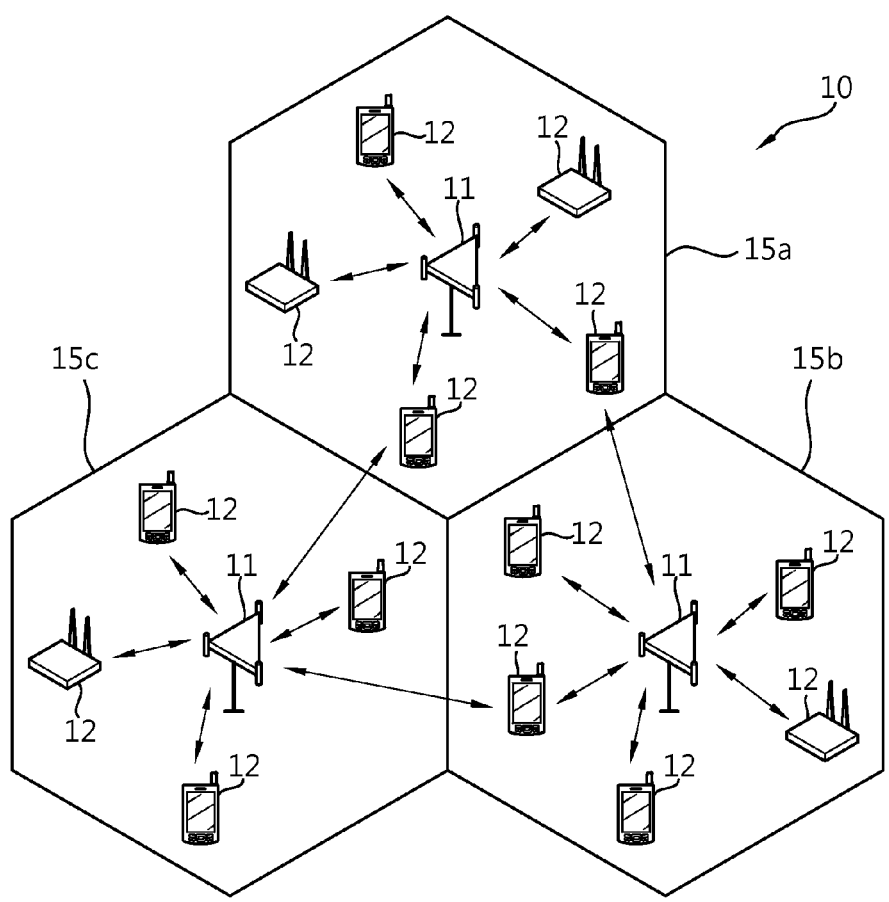
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
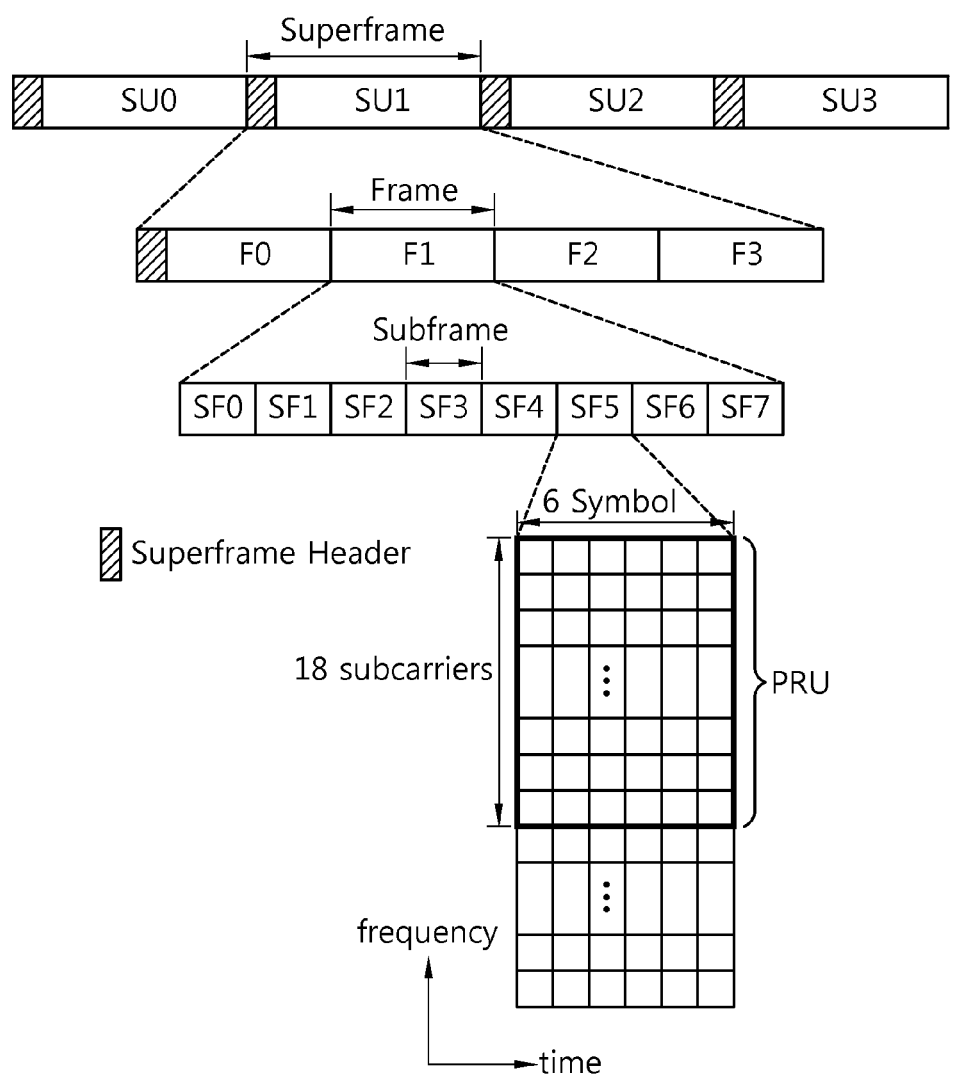
FIG. 2 to FIG. 5 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDMA symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

|  |  |  | Channel bandwidth, BW(MHz) | | | | |
| --- | --- | --- | --- | --- | --- | --- | --- |
|  |  |  | 5 | 7 | 8.75 | 10 | 20 |
| Sampling factor, n | | | 28/25 | 8/7 | 8/7 | 28/25 | 28/25 |
| Sampling frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time, Tb(μs) | | | 91.4 | 128 | 102.4 | 91.4 | 91.4 |
| G = 1/8 | Symbol time, Ts(μs) | | 102.857 | 144 | 115.2 | 102.857 | 102.857 |
|  | FDD | Number of OFDMA symbols per 5 ms frame | 48 | 34 | 43 | 48 | 48 |
|  |  | Idle time(μs) | 62.857 | 104 | 46.40 | 62.857 | 62.857 |
|  | TDD | Number of OFDMA symbols per 5 ms frame | 47 | 33 | 42 | 47 | 47 |
|  |  | TTG + RTG(μs) | 165.714 | 248 | 161.6 | 165.714 | 165.714 |
| G = 1/16 | Symbol time, Ts(μs) | | 97.143 | 136 | 108.8 | 97.143 | 97.143 |
|  | FDD | Number of OFDMA symbols per 5 ms frame | 51 | 36 | 45 | 51 | 51 |
|  |  | Idle time(μs) | 45.71 | 104 | 104 | 45.71 | 45.71 |
|  | TDD | Number of OFDMA symbols per 5 ms frame | 50 | 35 | 44 | 50 | 50 |
|  |  | TTG + RTG(μs) | 142.853 | 240 | 212.8 | 142.853 | 142.853 |
| G = 1/4 | Symbol time, Ts(μs) | | 114.286 | 160 | 128 | 114.286 | 114.286 |
|  | FDD | Number of OFDMA symbols per 5 ms frame | 43 | 31 | 39 | 43 | 43 |
|  |  | Idle time(μs) | 85.694 | 40 | 8 | 85.694 | 85.694 |
|  | TDD | Number of OFDMA symbols per 5 ms frame | 42 | 30 | 38 | 42 | 42 |
|  |  | TTG + RTG(μs) | 199.98 | 200 | 136 | 199.98 | 199.98 |
| Number of Guard subcarriers | Left | | 40 | 80 | 80 | 80 | 160 |
|  | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s=\text{floor}(n \cdot BW/8000) \times 8000$. A subcarrier spacing is defined as $\Delta f=F_s/N_{FFT}$. A useful symbol time is defined as $Tb=1/\Delta f$. A CP time is defined as $Tg=G \cdot Tb$. An OFDMA symbol time is defined as $Ts=Tb+Tg$. A sampling time is defined as $Tb/N_{FFT}$.

A time division duplex (TDD) method or a frequency division duplex (FDD) method can be applied to frames. A hybrid FDD (H-FDD) user equipment operation is included. In the TDD method, each subframe is used for uplink transmission or downlink transmission at different points of time in the same frequency. That is, in the TDD method, subframes within a frame are divided into uplink subframes and downlink subframes in the time domain. A switching point refers to a point at which a transmission direction from an uplink region to a downlink region or from a downlink region to an uplink region is changed. In the TDD method, the number of switching points within each frame is 2.

In the FDD method, each subframe is used for uplink transmission or downlink transmission in different frequencies of the same time. That is, in the FDD method, subframes within a frame are divided into uplink subframes and downlink subframes in the frequency domain. Uplink transmission and downlink transmission occupy different frequency bands, and they can be performed at the same time. In the case in which an H-FDD user equipment is included within a FDD system, a frame structure is similar to a TDD frame structure from a viewpoint of the H-FDD user equipment, but downlink transmission and uplink transmission are performed in two separated frequency bands. A transmission gap between uplink and downlink is necessary to switch a transmission circuit to a reception circuit.

A data burst can occupy one subframe or a plurality of contiguous subframes. If a data burst occupies a plurality of contiguous subframes, the data burst can occupy four subframes for each of downlink and uplink in an FDD system and can occupy all subframes in a TDD system.

A superframe header (SFH) can carry an essential system parameter and system configuration information. The SFH may be located in a first subframe of a superframe. The SFH may occupy last 5 orthogonal frequency division multiple access (OFDMA) symbols of the first subframe. The SFH can be classified into a primary-SFH (P-SFH) and a secondary-SFH (S-SFH). The P-SFH and the S-SFH can be transmitted in every superframe. The S-SFH can be transmitted in two consecutive superframes. Information transmitted on the S-SFH can be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP1 may include information on a ranging channel, resource mapping information such as subband partitioning and frequency partitioning, legacy support information for the support of an IEEE 802.16e mobile station (MS), etc. The S-SFH SP2 includes information on initial network entry and network discovery. The S-SFH SP3 includes other important system information.

Figure 3:
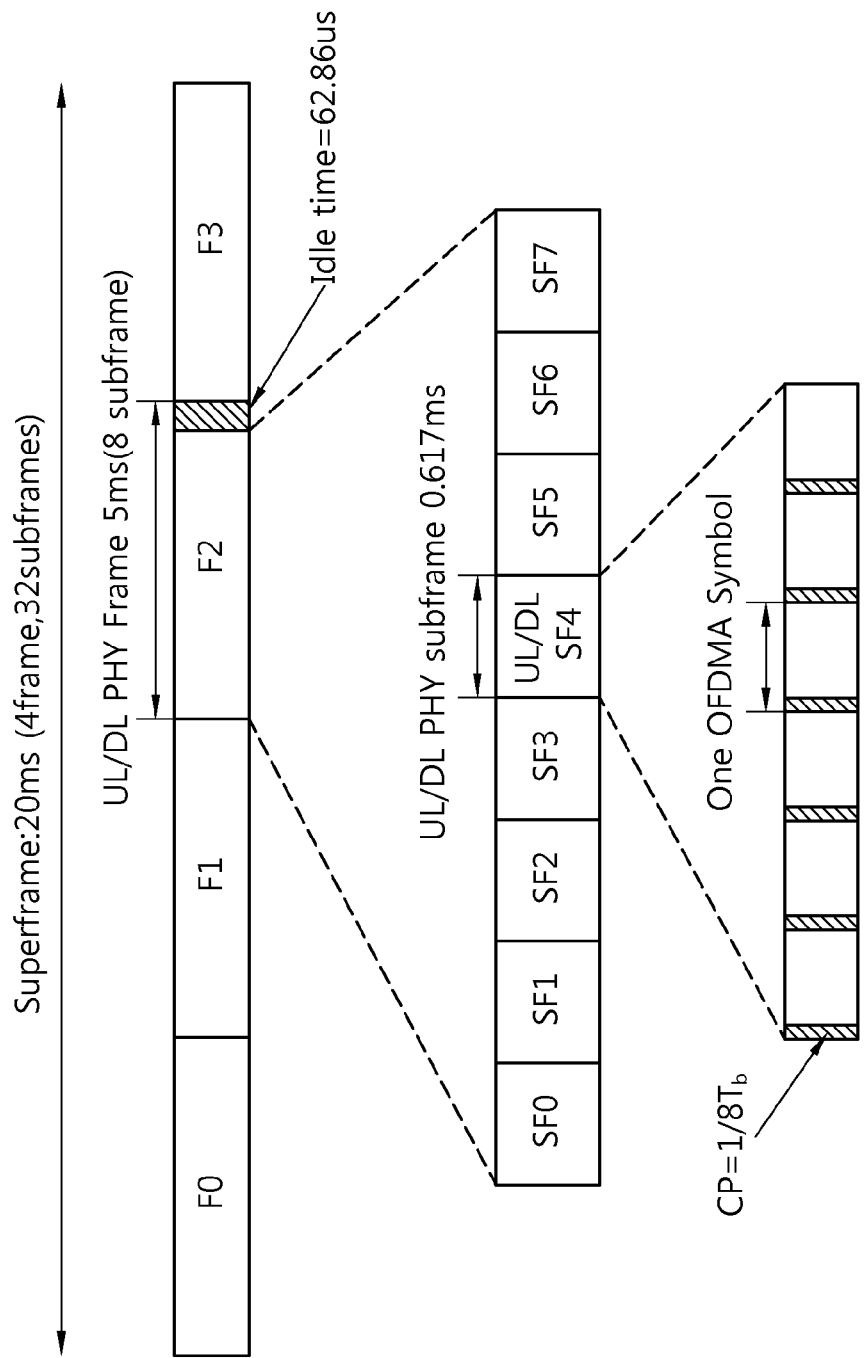

FIG. 3 shows another example of a frame structure. The frame structure of FIG. 3 shows a case in which G=1/8 in an FDD frame structure. One frame consists of eight subframes SF0, SF1, SF2, SF3, SF4, SF5, SF6, and SF7. A base station supporting an FDD mode has to support a half-duplex user equipment or a full-duplex user equipment operating in the same RF carrier at the same time. A user equipment supporting an FDD mode can use any one of H-FDD and or FDD. Each of subframes includes a downlink region and an uplink region. Downlink transmission and uplink transmission are divided from each other in the frequency domain. The FDD frame structure of FIG. 3 can be used when a bandwidth is 5 MHz, 10 MHz, or 20 MHz. An FDD user equipment can access uplink subframes in a downlink subframe and at the same time receive a data burst. An H-FDD user equipment can transmit or receive data in each subframe, but cannot transmit and receive data at the same time.

Figure 4:
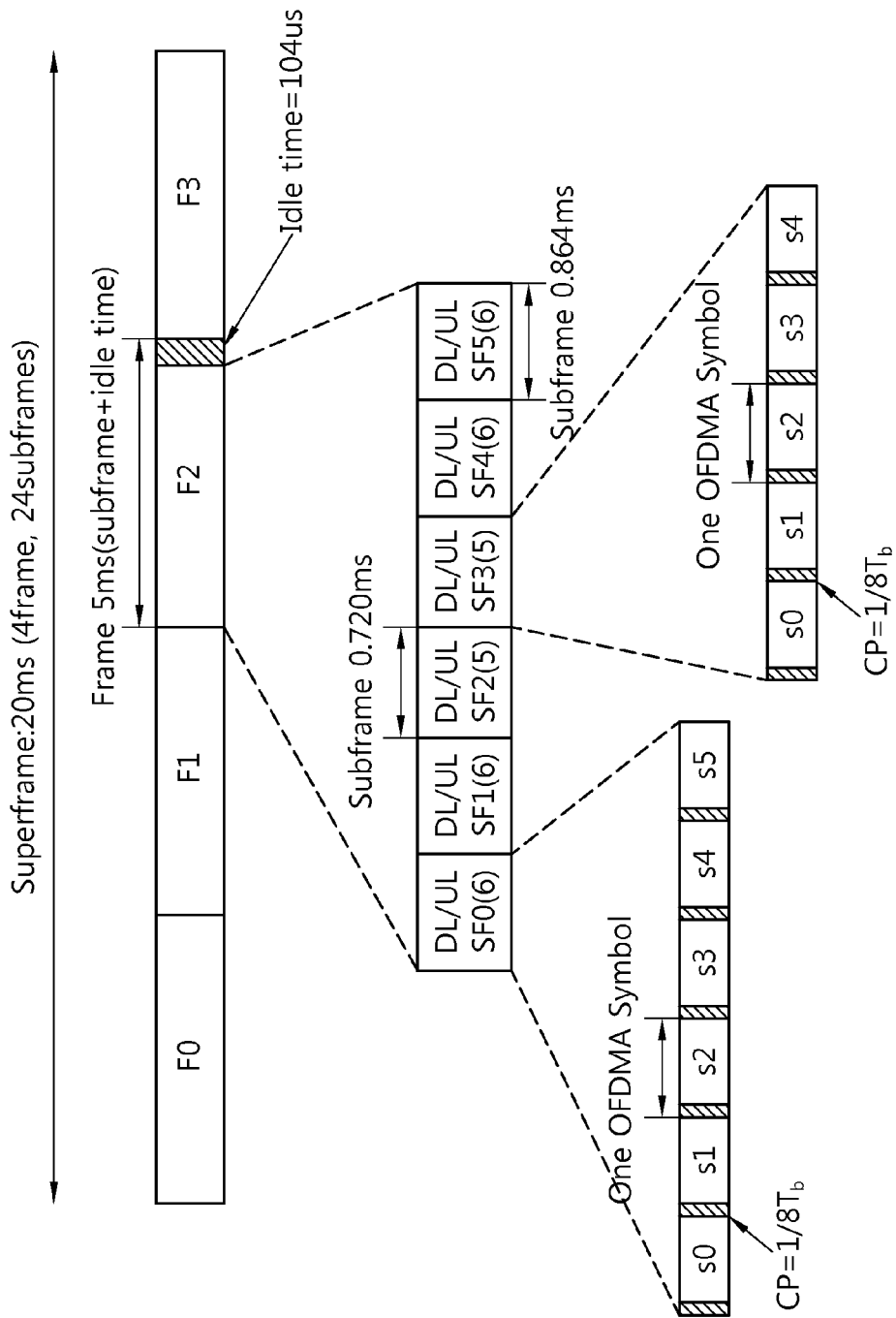

FIG. 4 shows another example of a frame structure. The frame structure of FIG. 4 shows a case in which G=1/8 in an FDD frame structure. The FDD frame structure of FIG. 4 can also be used when a bandwidth is 7 MHz. Each of four of six subframes includes 6 OFDMA symbols, and each of third and fourth subframes includes 5 OFDMA symbols.

Figure 5:
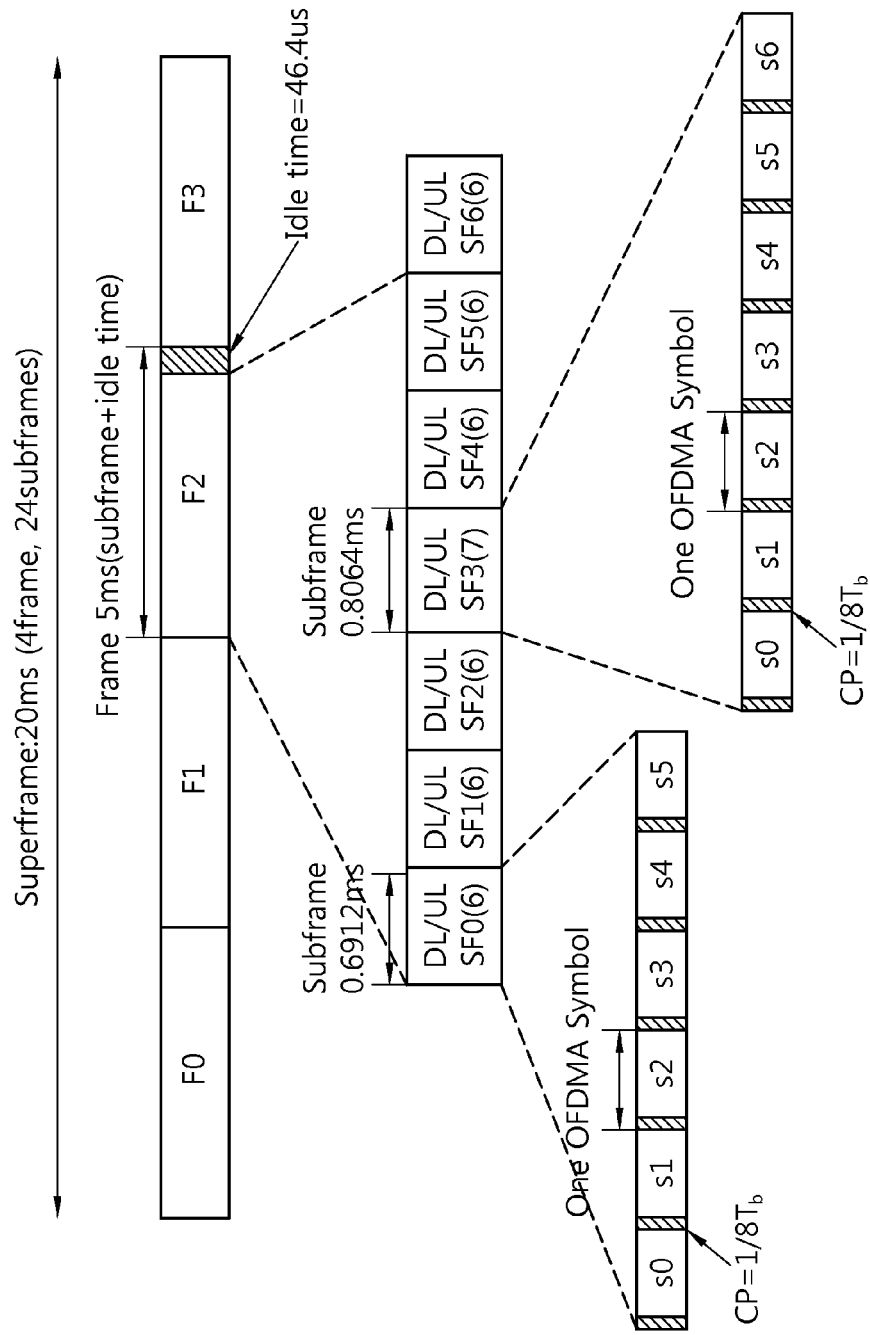

FIG. 5 shows another example of a frame structure. The frame structure of FIG. 5 shows a case in which G=1/8 in an FDD frame structure. The FDD frame structure of FIG. 5 can also be used when a bandwidth is 8.75 MHz. A fourth subframe of seven subframes includes seven OFDMA symbols, and each of the remaining subframes includes 6 OFDMA symbols.

Figure 6:
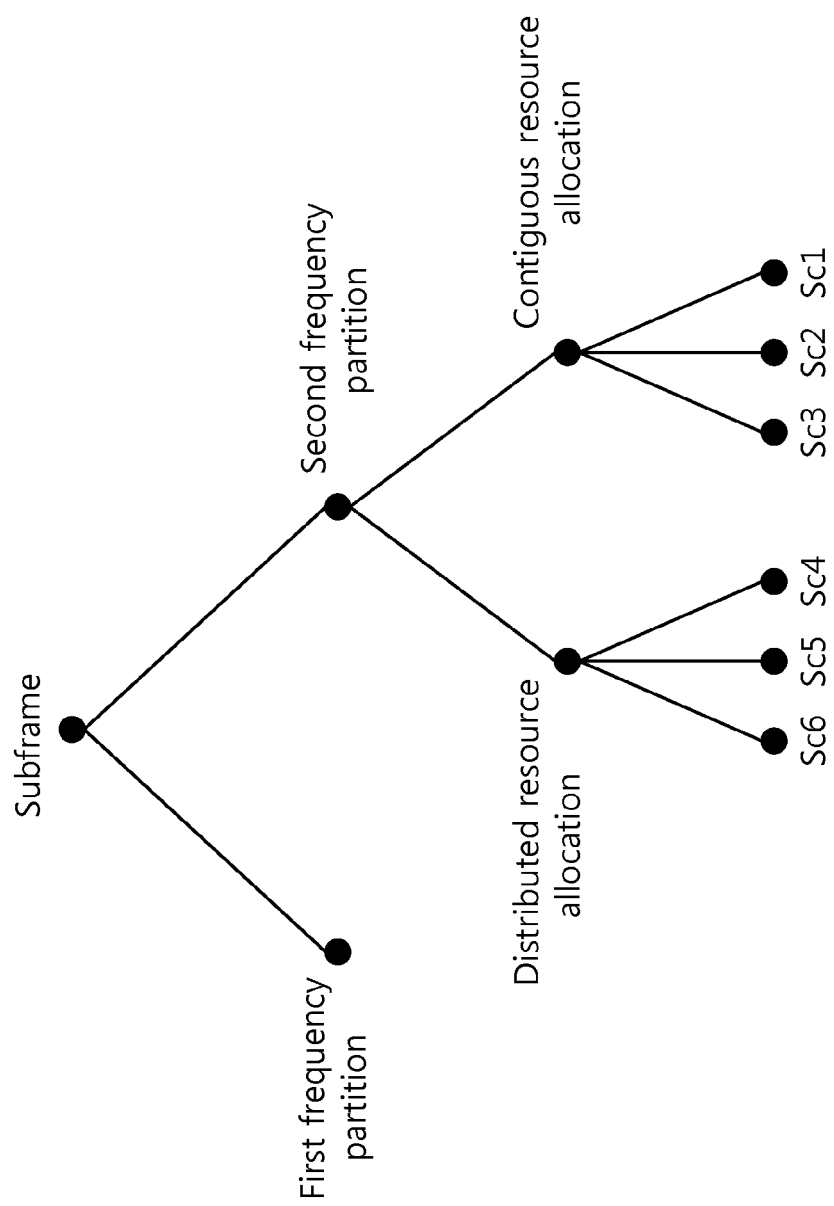
FIG. 6 shows an example of an uplink resource structure.

FIG. 6 shows an example of an uplink resource structure.

Referring to FIG. 6, an uplink subframe can be divided into at least one FP. Herein, the subframe is divided into two FPs (i.e., FP1 and FP2) for example. However, the number of FPs in the subframe is not limited thereto. The number of FPs can be 4 at most. Each FP can be used for other purposes such as FFR. Each FP consists of at least one physical resource unit (PRU). Each FP may include distributed resource allocation and/or contiguous resource allocation. Each frequency partition can be used for other purposes, such as fractional frequency reuse (FFR). Herein, the second FP (i.e., FP2) includes the distributed resource allocation and the contiguous resource allocation. 'Sc' denotes a subcarrier.

A PRU is a basic physical unit for resource allocation, and consists of a plurality of consecutive OFDMA symbols in the time domain and a plurality of consecutive subcarriers in the frequency domain. The number of OFDMA symbols included in the PRU may be equal to the number of OFDMA symbols included in one subframe. Therefore, the number of OFDMA symbols in the PRU can be determined according to a subframe type. For example, when one subframe consists of 6 OFDMA symbols, the PRU may be defined with 18 subcarriers and 6 OFDMA symbols.

A logical resource unit (LRU) is a basic logical unit for distributed resource allocation and contiguous resource allocation. The LRU is defined with a plurality of OFDMA symbols and a plurality of subcarriers, and includes pilots used in the PRU. Therefore, a desired number of subcarriers for one LRU depends on the number of allocated pilots.

A distributed logical resource unit (DLRU) may be used to obtain a frequency diversity gain. The DLRU includes a distributed subcarrier group in one frequency partition. The DRU has the same size as the PRU. A tile is a basic unit of constituting the DLRU, and a size of an uplink tile is 6 subcarriers*Nsym OFDMA symbols. Nsym may be changed according to a subframe type.

A contiguous logical resource unit (CLRU) may be used to obtain a frequency selective scheduling gain. The CLRU includes a localized subcarrier group. The CLRU has the same size as the PRU.

Hereinafter, a structure of a ranging channel will be described.

In an IEEE 802.16e system, the structure of the ranging channel may differ according to usage of the ranging channel. The ranging channel can be used for the usage of initial access or handover, or can be used for the usage of periodic ranging or bandwidth request. A mobile station (MS) can transmit an initial access ranging channel to establish initial uplink time synchronization, and can transmit a handover ranging channel for handover to another cell. Alternatively, a periodic ranging channel can be transmitted to update time and frequency synchronization, and a bandwidth request ranging channel can be transmitted to request a frequency resource. A type of the ranging channel and allocation information of time or frequency resources allocated to the ranging channel can be broadcast by using UL-MAP.

Figure 7:
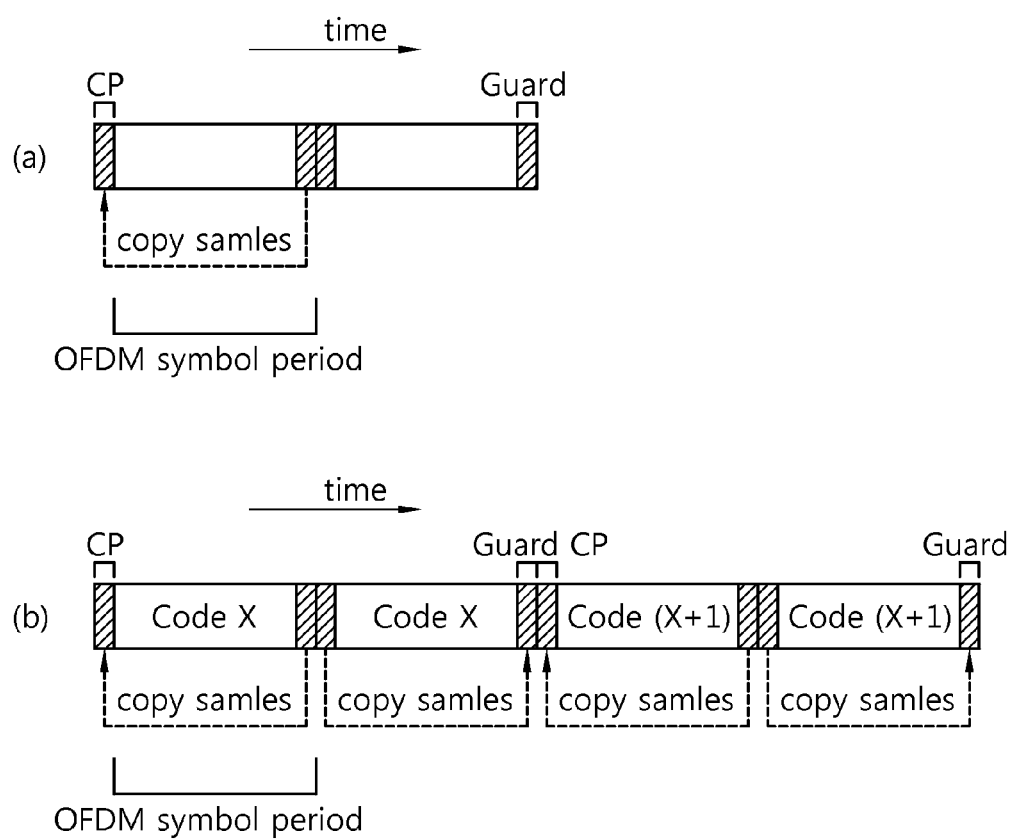
FIG. 7 shows an exemplary structure of an initial access ranging channel or a handover ranging channel of an IEEE 802.16e system.

FIG. 7 shows an exemplary structure of an initial access ranging channel or a handover ranging channel of an IEEE 802.16e system.

A ranging channel of FIG. 7-(a) includes two consecutive OFDMA symbols. In respective symbol durations, the same ranging code can be transmitted in the ranging channel without phase discontinuity between two symbols. A ranging channel of FIG. 7-(b) includes four consecutive OFDMA symbols. A base station (BS) can allocate two consecutive ranging codes, and thus an MS transmits two consecutive ranging codes. That is, a ranging code used in a $3^{rd}$ OFDMA symbol and a $4^{th}$ OFDMA symbol may be a ranging code consecutive to a code used in a $1^{st}$ OFDMA symbol and a $2^{nd}$ OFDMA symbol. The BS can select one of the ranging channel structures of FIG. 7-(a) and FIG. 7-(b) and can broadcast the selected ranging channel structure to the MS. For example, a cell having a good channel state can use the ranging channel structure of FIG. 7-(a), and a cell having a bad channel state can use the ranging channel structure of FIG. 7-(b).

Figure 8:
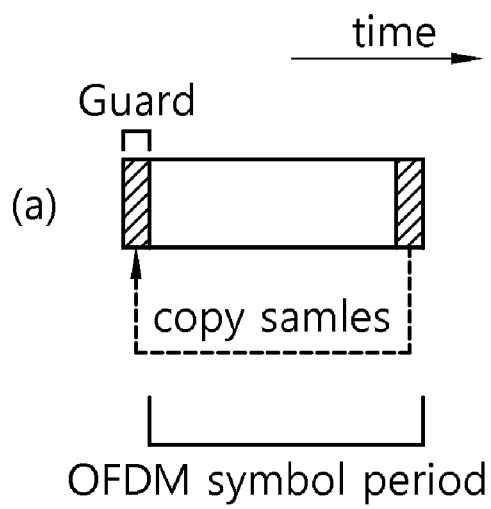
FIG. 8 shows an exemplary structure of a periodic ranging channel or a bandwidth request ranging channel of an IEEE 802.16e system.
Figure 8:
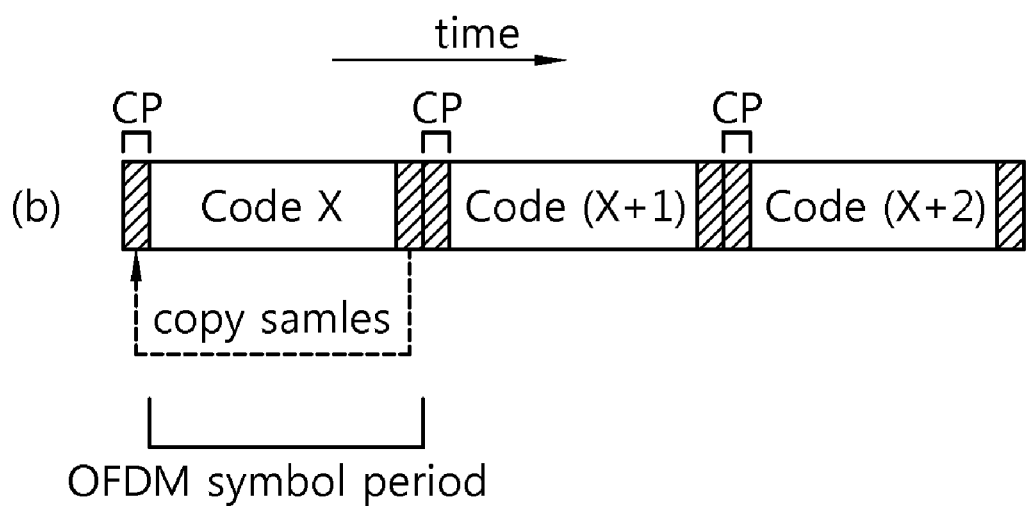

FIG. 8 shows an exemplary structure of a periodic ranging channel or a bandwidth request ranging channel of an IEEE 802.16e system.

A ranging channel of FIG. 8-(a) includes one OFDMA symbol. In one OFDMA symbol duration, one ranging code can be modulated over a ranging sub-channel. The ranging sub-channel can be dynamically allocated by media access control (MAC), and can be indicated by UL-MAP. A ranging channel of FIG. 8-(b) includes three OFDMA symbols. In three OFDMA symbol durations, three consecutive ranging codes can be modulated over a ranging sub-channel. The ranging sub-channel can be dynamically allocated by MAC, and can be indicated by UL-MAP.

Figure 9:
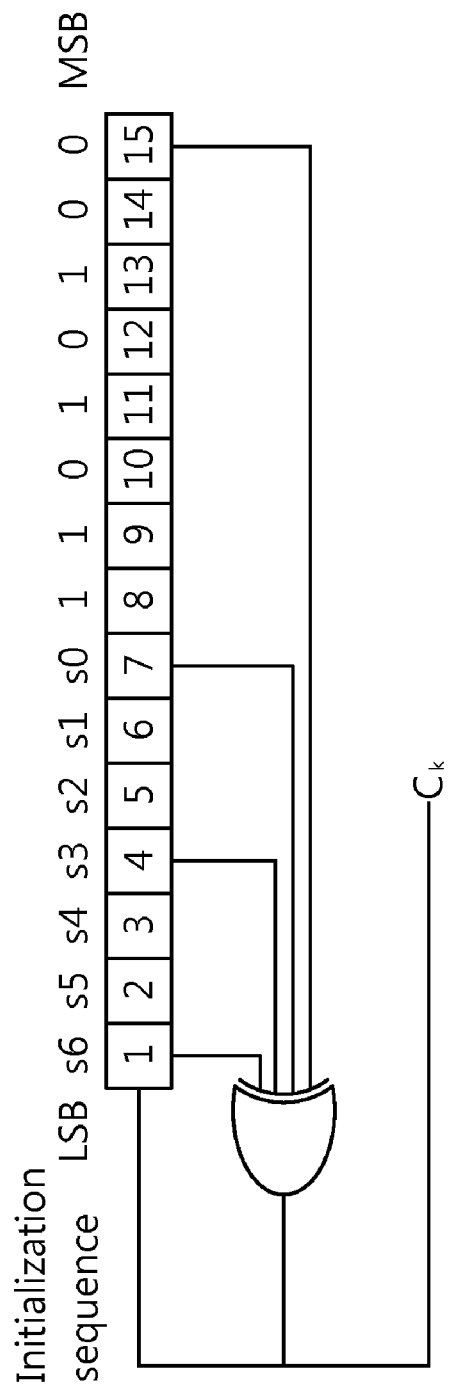
FIG. 9 is a logic diagram of a pseudo random binary sequence (PRBS) generator for generating a ranging code used in FIG. 7 and FIG. 8.

FIG. 9 is a logic diagram of a pseudo random binary sequence (PRBS) generator for generating a ranging code used in FIG. 7 and FIG. 8. Four types of ranging channel proposed in FIG. 7 and FIG. 8 may have different ranging codes. The PRBS generator of FIG. 9 generates a ranging code by using $1+x^1+x^4+x^7+x^{15}$ as a PN code generation equation. In this case, various values can be used as an initial value of a PRBS. For example, $\{b14, b13, \ldots, b1, b0\} = \{0, 0, 1, 0, 0, 1, 0, 1, 1, s0, s1, s2, s3, s4, s5, s6\}$ can be used as the initial value of the PRBS. Herein, $\{b6, \ldots, b0\}$ may denote UL_PermBase, and s6 may denote a least significant bit (LSB) of the initial value of the PRBS and a most significant bit (MSB) of U1_PermBase. By using the PN code generation equation, 256 ranging codes can be generated in total, and the generated ranging code is identified according to each usage. For example, first N codes are used for the usage of initial access ranging, following M codes are used for the usage of periodic ranging, following L codes are used for the usage of bandwidth request ranging, and last P codes are used for the usage of handover ranging. The number of ranging codes used for each usage may be broadcast.

In the IEEE 802.16m system, the ranging channel may include a ranging channel for a non-synchronized MS and a ranging channel for a synchronized MS. The ranging channel for the non-synchronized MS can be used for the usage of initial network entry of the MS and for the usage of ranging on a target BS during handover. The ranging channel for the synchronized MS can be used for periodic ranging. An MS synchronized previously with the target BS can transmit a ranging signal for the synchronized MS.

Figure 10:
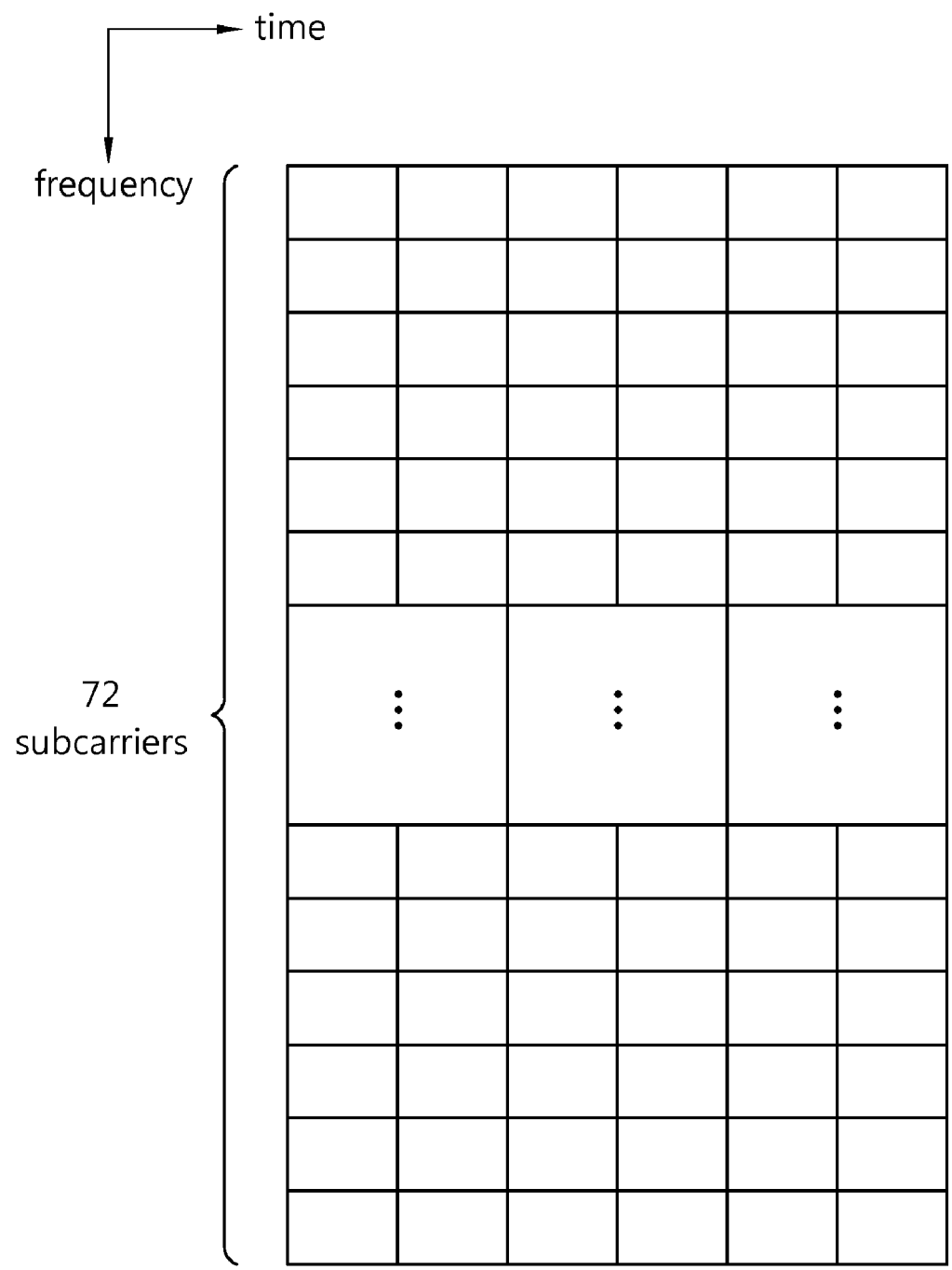
FIG. 10 to FIG. 11 shows an exemplary structure of a periodic ranging channel in an IEEE 802.16m system.

FIG. 10 shows an exemplary structure of a periodic ranging channel in an IEEE 802.16m system.

The ranging channel can be allocated to one sub-band including 72 consecutive subcarriers. In the periodic ranging channel of the IEEE 802.16m system, a basic structure can be constructed of one sub-band and one OFDMA symbol. To cover a wider area, the basic structure may be repeated in a time domain. The basic structure may be repeated in the time domain 2 or 3 times. If the basic structure is repeated 2 times, the ranging channel has 3 transmission opportunities in one subframe. If the basic structure is repeated 3 times to cover a wider area, the ranging channel has 2 transmission opportunities in one subframe. When the basic structure is repeated 2 times in a macro cell, 3 transmission opportunities of the ranging channel are allocated in one subframe. If a size of the macro cell is not great, the basic structure may be not necessarily repeated in the time domain, and the remaining subcarriers can be used as a data resource block similarly to a femto cell. In addition, one subframe can be allocated to the ranging channel in every M subframes at a bandwidth of 10 MHz.

Figure 11:
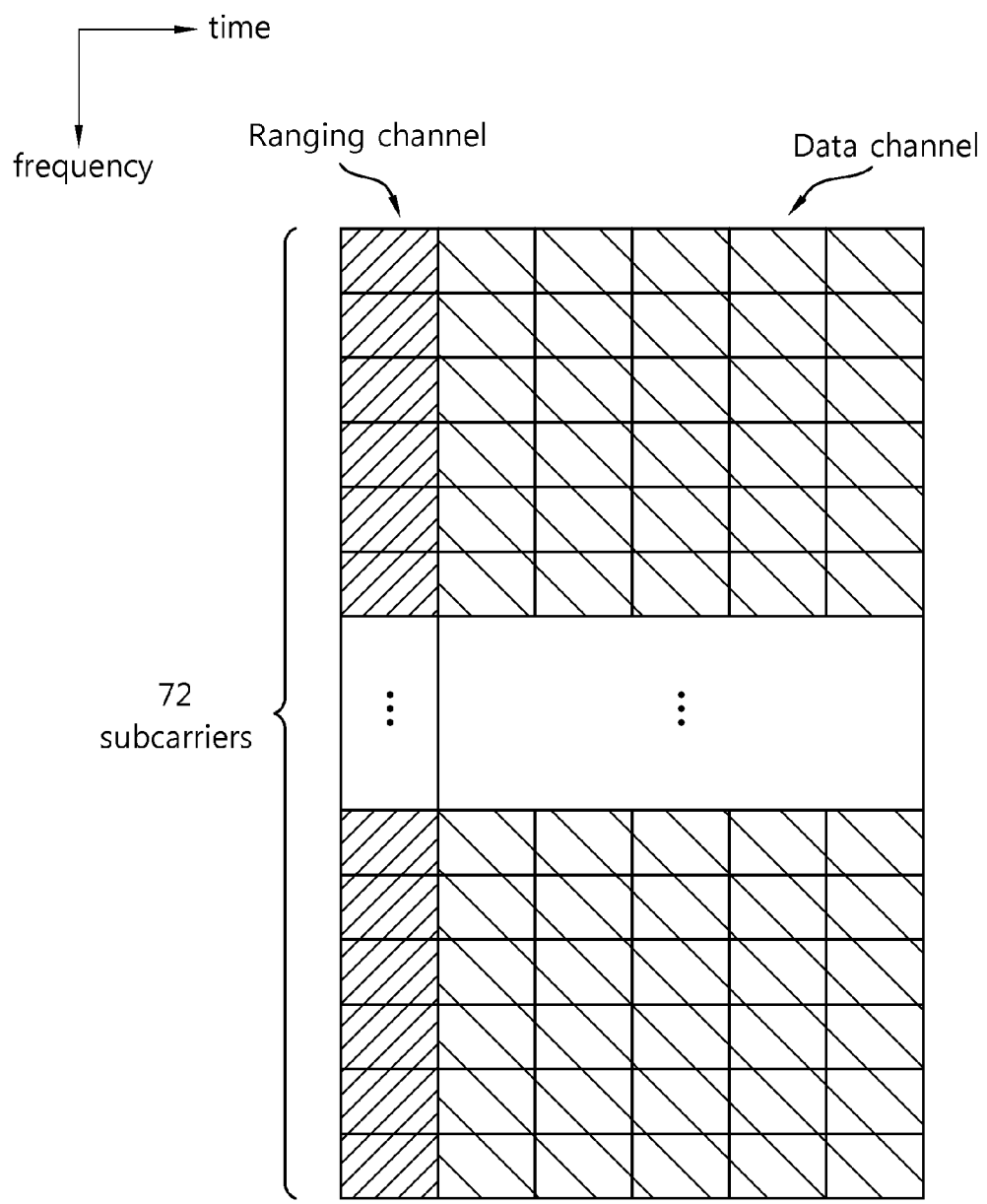

FIG. 11 shows another exemplary structure of a periodic ranging channel in an IEEE 802.16m system. The ranging channel of FIG. 8 can be used in a femto cell. The ranging channel in the femto cell may be TDM-multiplexed with a data channel. The ranging channel may occupy one sub-band including 72 consecutive subcarriers and one OFDMA symbol in one subframe, and the remaining subcarriers may constitute a CRU corresponding to 5 OFDMA symbols. As such, when the ranging channel and the data channel are TDM-multiplexed in the femto cell, time synchronization can be established correctly and high spectral efficiency can be achieved. However, there is a disadvantage in that two types of PRU exist in one subframe.

A sequence of Equation 1 can be used as a ranging preamble code used in the ranging channel.

$$s_{k+1,m} = c_u(k+m) = \exp^{\frac{-ju\pi(k+m)(k+m+1)}{N_{ZC}}}, k = 0, \ldots, N_{ZC} \quad [\text{Equation 1}]$$

In Equation 1, ZC may be 71. m denotes a cyclic shift value in each cell, and may be any one value selected from the set of $\{0, 10, 20, 30, 40, 50, 60\}$. Since 7 sequences are allocated for $u=1, \ldots, 70$ in each cell, 490 sequences can be used in total. A cyclic shift is applied based on m in a frequency domain, and a plurality of ranging preamble codes are generated. All root indices are used in one cell, and different cyclic shift values are used in adjacent cells.

A ZC sequence having a root index r and a length $N_{ZC}$ can be defined by Equation 2. The ZC sequence can be used as the ranging preamble code of the ranging channel.

$$x_r(k) = \quad [\text{Equation 2}]$$
$$\begin{cases} \exp\left(\frac{-j2\pi r}{N_{ZC}}\left(\frac{k^2}{2}+qk\right)\right), & k = 0, 1, \ldots, N_{ZC}-1 \text{ if } N_{ZC} \text{ is even.} \\ \exp\left(\frac{-j2\pi r}{N_{ZC}}\left(\frac{k(k+1)}{2}+qk\right)\right), & k = 0, 1, \ldots, N_{ZC}-1 \text{ if } N_{ZC} \text{ is odd.} \end{cases}$$

In Equation 1, q may be any natural number. If q=0, an odd-length ZC sequence can be expressed by Equation 3.

$$x_r(k) = \exp\left(-j\frac{\pi r k(k+1)}{N_{zc}}\right), k = 0, 1, \ldots, N_{zc}-1 \quad [\text{Equation 3}]$$

In Equation 2 or Equation 3, if $N_{ZC}$ is a prime number, all natural numbers from 0 to $N_{ZC}-1$ can be used without deteriorating sequence properties (e.g., auto-correlation, cross-correlation, etc.).

A cyclic shift can be applied in a domain where the ZC sequence is defined. That is, when the ZC sequence is defined in a time domain, the ZC sequence can be cyclic shifted in the time domain, and when the ZC sequence is defined in a frequency domain, the ZC sequence can be cyclic shifted in the frequency domain. Irrespective of in which domain the ZC sequence is defined, if q=0, the ZC sequence to which cyclic shift is applied can be expressed by Equation 4 and Equation 5.

$$x_r(n) = \exp\left(-j\frac{\pi rn(n+1)}{N_{ZC}}\right), 0 \leq n \leq N_{ZC} - 1 \quad \text{[Equation 4]}$$

$$x_{r,v}(n) = x_r((n + C_v) \bmod N_{ZC}) \quad \text{[Equation 5]}$$

In Equation 5, $x_{r,v}(n)$ denotes a $v^{th}$ cyclic shifted sequence having a root index r, and $C_v$ denotes a $v^{th}$ cyclic shifted value.

A generalized chirp-like (GCL) sequence having a root index r and a length $N_{ZC}$ can be defined by Equation 6. The GCL sequence can also be used as the ranging preamble code of the ranging channel.

$$x_r(k) = \exp\left(-j2\pi r\frac{k(k+q)}{N_{GCL}}\right), k = 0, 1, \ldots, N_{GCL} - 1 \quad \text{[Equation 6]}$$

In Equation 6, q may be any natural number.

An extended ZC sequence (or a padded ZC sequence) having a length $N_{ZC}+n$ obtained from a ZC sequence having a root index r and a length $N_{ZC}$ can be defined by Equation 7. The extended ZC sequence can also be used as the ranging preamble code of the ranging channel.

$$x_r(k) = \begin{cases} \exp\left(\frac{-j2\pi r}{N_{ZC}}\left(\frac{k^2}{2} + qk\right)\right), & k = 0, 1, \ldots, N_{ZC} - 1 \text{ if } N_{ZC} \text{ is even.} \\ \exp\left(\frac{-j2\pi r}{N_{ZC}}\left(\frac{k(k+1)}{2} + qk\right)\right), & k = 0, 1, \ldots, N_{ZC} - 1 \text{ if } N_{ZC} \text{ is odd.} \end{cases} \quad \text{[Equation 7]}$$

In Equation 7, q may be any natural number. If q=0, an odd-length ZC sequence can be expressed by Equation 8.

$$x_r(k) = \exp\left(-j\frac{\pi rk(k+1)}{N_{zc}}\right), k = 0, 1, \ldots, N_{zc} + n - 1 \quad \text{[Equation 8]}$$

In Equation 7 or Equation 8, if $N_{ZC}$ is a prime number, all natural numbers from 0 to $N_{ZC}-1$ can be used without deteriorating sequence properties (e.g., auto-correlation, cross-correlation, etc.).

A ranging preamble code can be generated and transmitted through a ranging channel. A base station detects a received ranging preamble code. In order to improve the detection performance of a base station, a variety of ranging channel structures can be taken into consideration.

Figure 12:
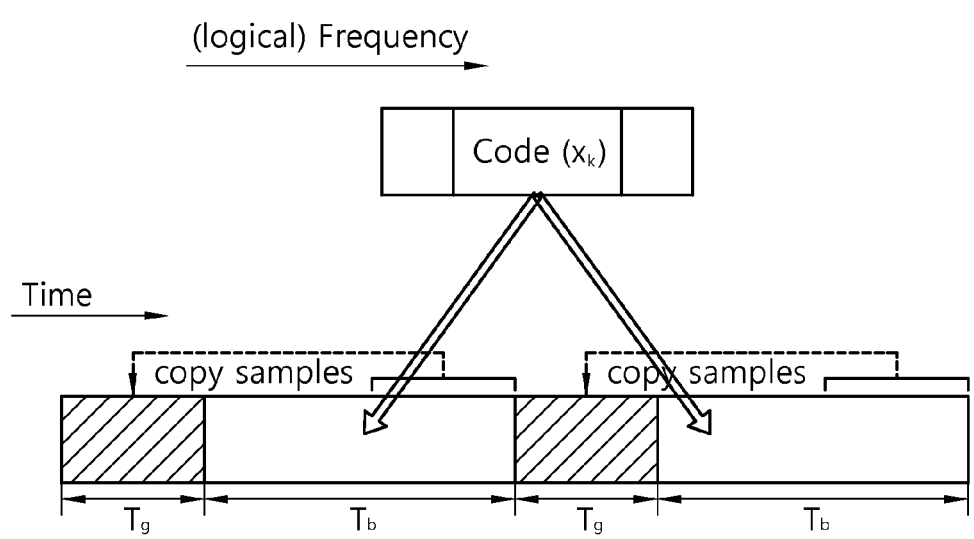
FIG. 12 shows an example of a ranging channel structure using a simple repetition code.

FIG. 12 shows an example of a ranging channel structure using a simple repetition code. The detection performance of a reception terminal can be improved using the simple repetition ranging channel structure in the time domain. Referring to FIG. 12, in the frequency domain, a basic code 'Code $(x_k)$' (where k=0, ..., N–1 and N is a code length) is mapped to an OFDMA symbol, and a time domain signal is generated through OFDMA modulation (e.g., IFFT). Tg indicates a Cyclic Prefix (CP) length, and Tb indicates a useful symbol time. OFDMA modulation can be performed on a symbol basis or can be performed only once and repeatedly used. Two OFDMA symbols are used to transmit the same signal. A reception terminal can obtain a combined gain by combining repeated signals in the time domain.

In the case in which the simple repetition ranging channel structure is used, only a combined gain can be obtained in the detection performance of a base station. Accordingly, another ranging channel structure can be proposed in order to further improve the detection performance.

Hereinafter, the present invention proposes a method using a covering code (or masking code) without using the simple repetition structure in the time domain in order to improve the detection performance or the false alarm rate performance or both of a ranging preamble code in a base station or a reception terminal. In the following description, for example, a modification sequence, such as a ZC sequence, an extended ZC sequence, a padded ZC sequence, or a truncated ZC sequence, is described as the ranging preamble code on the basis of a specific ranging channel structure, but the type and structure of a channel and the type of a used code are not limited thereto. Further, in the present invention, a Single Input Single Output (SISO) is assumed and described, for convenience of description, but the number of transmission and reception antennas is not limited thereto. In addition, a basic code in the frequency domain and a covering code in the time domain are assumed and described, but a basic code in the time domain and a covering code in the time domain may be used.

Figure 13:
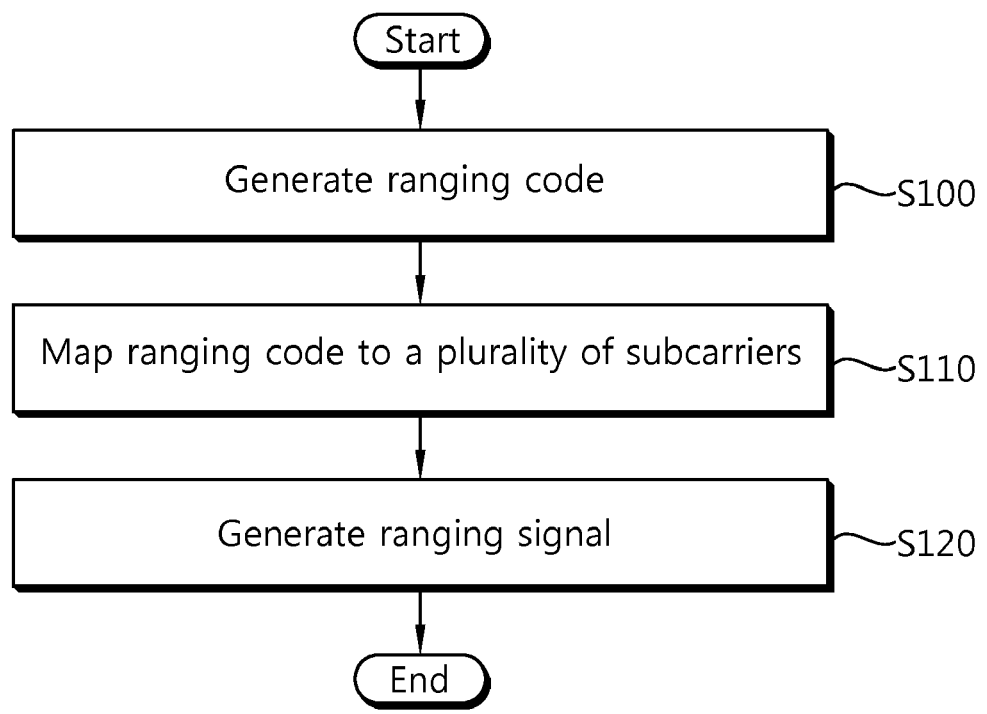
FIG. 13 shows an embodiment of the proposed method of generating a ranging signal.

FIG. 13 shows an embodiment of the proposed method of generating a ranging signal.

At step S100, a user equipment generates a ranging code in which a covering code is applied to each of a plurality of OFDMA symbols. At step S110, the user equipment maps the ranging code to a plurality of subcarriers constituting each of the OFDMA symbols. At step S120, the user equipment generates a ranging signal by performing OFDMA modulation on each of the OFDMA symbols.

Figure 14:
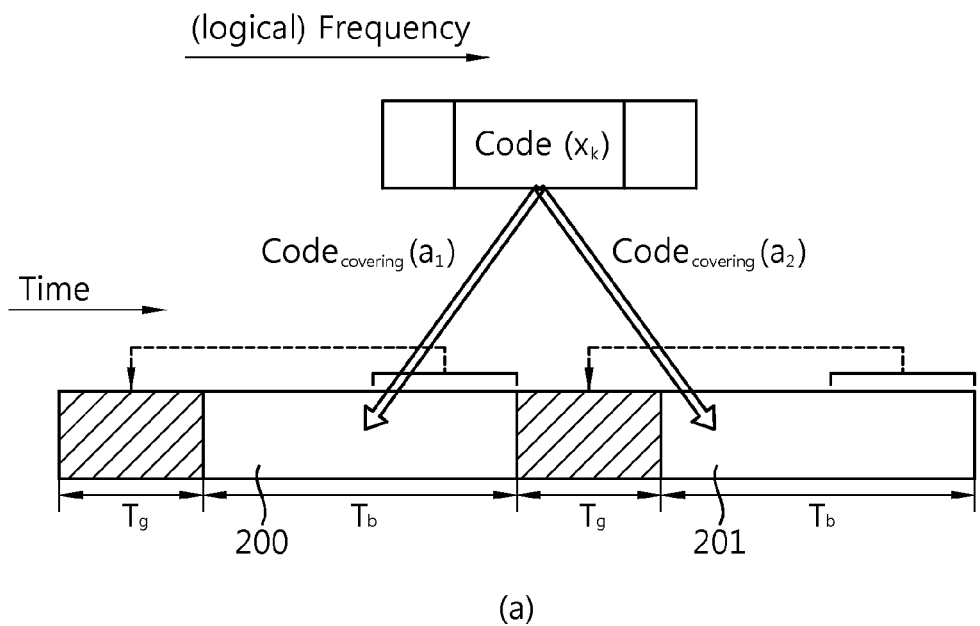
FIG. 14 shows an example of a ranging channel structure according to the proposed method of generating a ranging signal.
Figure 14:
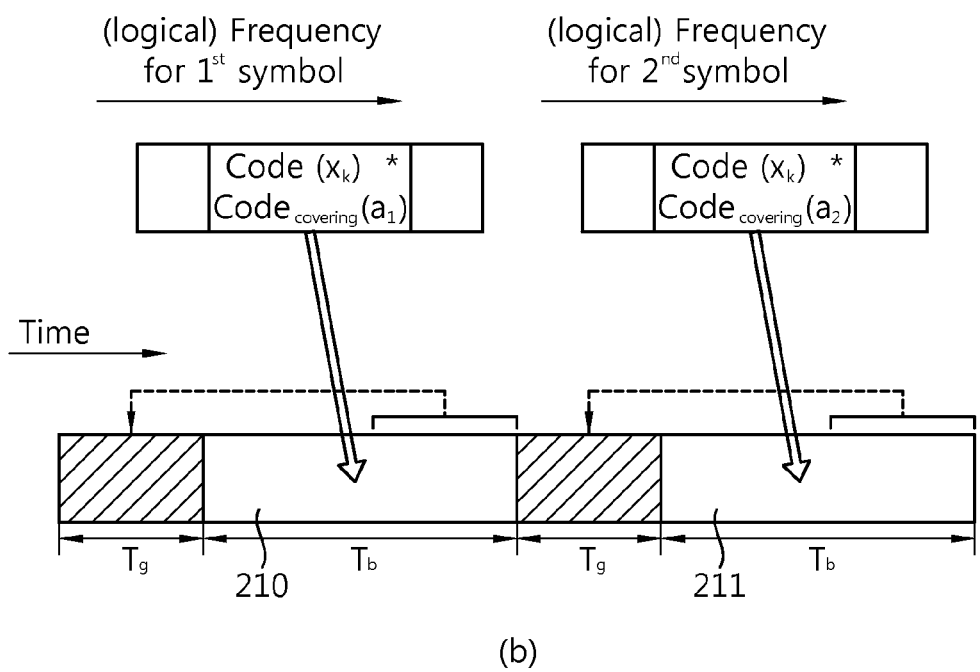

FIG. 14 shows an example of a ranging channel structure according to the proposed method of generating a ranging signal.

FIG. 14(a) shows an example in which a covering code is used in the time domain. In the frequency domain, a basic code 'Code $(x_k)$' (where k=0, ..., N–1 and N is a code length) is mapped to an OFDMA symbol, and a ranging signal is generated through OFDMA modulation (e.g., IFFT). Further, a covering code $\text{Code}_{covering}(a_n)$ (where n=0, ..., R–1 and R is the number of repetitions) having the same length as the number of repetitions is multiplied to the ranging signal for every repetition period. An orthogonal sequence can be used as the covering code. For example, in the case in which a code is repeated twice, the length of the covering code is 2, and [1 1] or [1 –1] can be used as a covering code [a1 a2]. In the case in which [1 –1] is used as the covering code, a ranging signal within the first repetition period is multiplied by 1, and a ranging signal within the second repetition period is multiplied by –1. A user equipment can transmit a ranging signal multiplied by a covering code, and a base station or a reception terminal can distinguish different covering codes on the basis of the orthogonality of the covering code and detect the ranging signal. In FIG. 14(a), it is assumed that the OFDMA modulation is performed once, but may be performed for every repetition period.

FIG. 14(b) shows an example in which a covering code is used in the frequency domain. A basic code 'Code $(x_k)$'

(where k=0, ..., N−1 and N is a code length) is multiplied by $Code_{covering}$ ($a_n$) (where n=0, ..., R−1 and R is a repeated number of times) (i.e., a covering code having the same length as the number of repetitions) and then mapped to an OFDMA symbol. Further, a ranging signal is generated through OFDMA modulation for every repetition period. An orthogonal sequence can be used as the covering code. For example, in the case in which a code is repeated twice, the length of the covering code is 2, and [1 1] or [1 −1] can be used as a covering code [a1 a2]. In the case in which [1 −1] is used as the covering code, each of all the basic codes is multiplied by 1 in a subcarrier level within the first repetition period, and each of all the basic codes is multiplied by −1 in a subcarrier level within the second repetition period. A user equipment transmits a ranging signal multiplied by the covering code, and a base station or a reception terminal can distinguish different covering codes on the orthogonality of a covering code and detect the ranging signal. Likewise, in FIG. 14(b), it is assumed that the OFDMA modulation is performed once, but may be performed for every repetition period.

In FIGS. 14(a) and 14(b), ranging signals are generated using different methods, but the generated ranging signals are identical with each other. In the proposed method of generating a ranging signal, repetition periods can maintain orthogonality with other transmission signals or reception signals, respectively, using covering codes which are orthogonal to each other. That is, although two user equipments use the same basic code, ranging signals transmitted by the two user equipments can be distinguished from each other using different covering codes.

Figure 15:
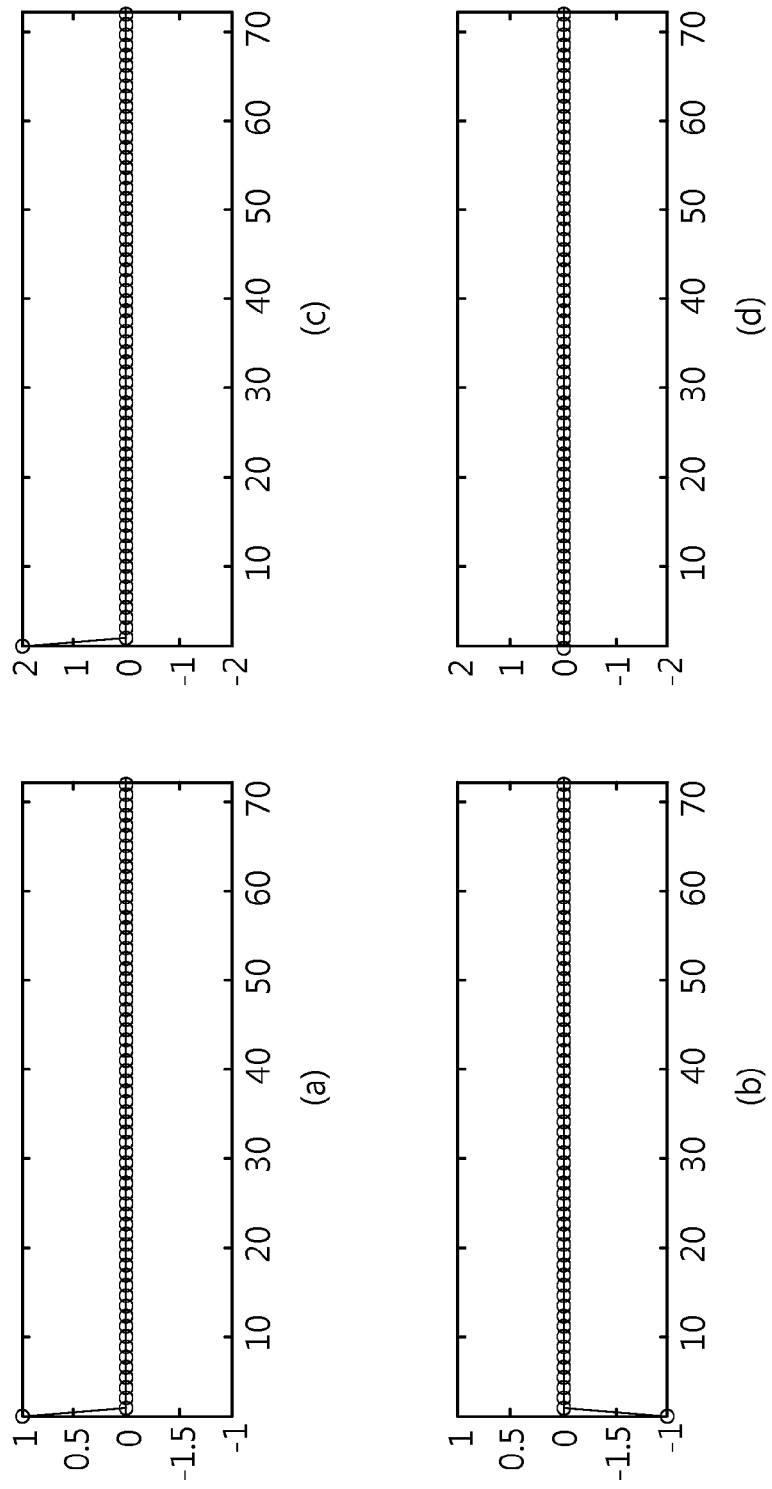
FIG. 15 shows an example in which a reception terminal dispreads a ranging signal in the case in which a covering code is used in the proposed method of generating a ranging signal.

FIG. 15 shows an example in which a reception terminal dispreads a ranging signal in the case in which a covering code is used in the proposed method of generating a ranging signal. In the graph of FIG. 15, an x axis indicates the length of a code, and a y axis indicates the amplitude of an auto-correlation value.

A user equipment transmits a ranging signal in which a basic code is repeated twice using a code x to which a covering code [1 −1] has been applied. FIG. 15(a) shows correlation values in the first repetition period for the received ranging signal. Here, a peak of the correlation value is 1. FIG. 15(b) shows correlation values in the second repetition period for the received ranging signal. Here, a peak of the correlation value is −1. A base station can despread the ranging signal using [1 −1] or [1 1] (i.e., an available covering code) within a cell. FIG. 15(c) shows a case in which the ranging signal is despread using [1 −1]. Here, a peak of the correlation value rises to 2. FIG. 15(d) shows a case in which the ranging signal is despread using [1 1]. Here, peaks of the correlation values are offset, thus become 0. That is, a crossing correlation value between the covering codes can become 0 by the orthogonality of the covering codes. In FIGS. 15(a) and 15(b), the symbol of a peak of the correlation value can be changed by a fading channel. However, it can be assumed that the fading channel is not greatly changed according to a lapse of time in neighboring repetition periods and thus the symbol of a peak of the correlation value is rarely changed or all changed in neighboring repetition periods. Accordingly, orthogonality between the covering codes is not broken.

In using a covering code, a covering code having the same length as the number of repetitions cannot be used, but a covering code having a smaller length than the number of repetitions can be used. This is because orthogonality between the covering codes is not guaranteed with an increase of the number of repetitions.

Figure 16:
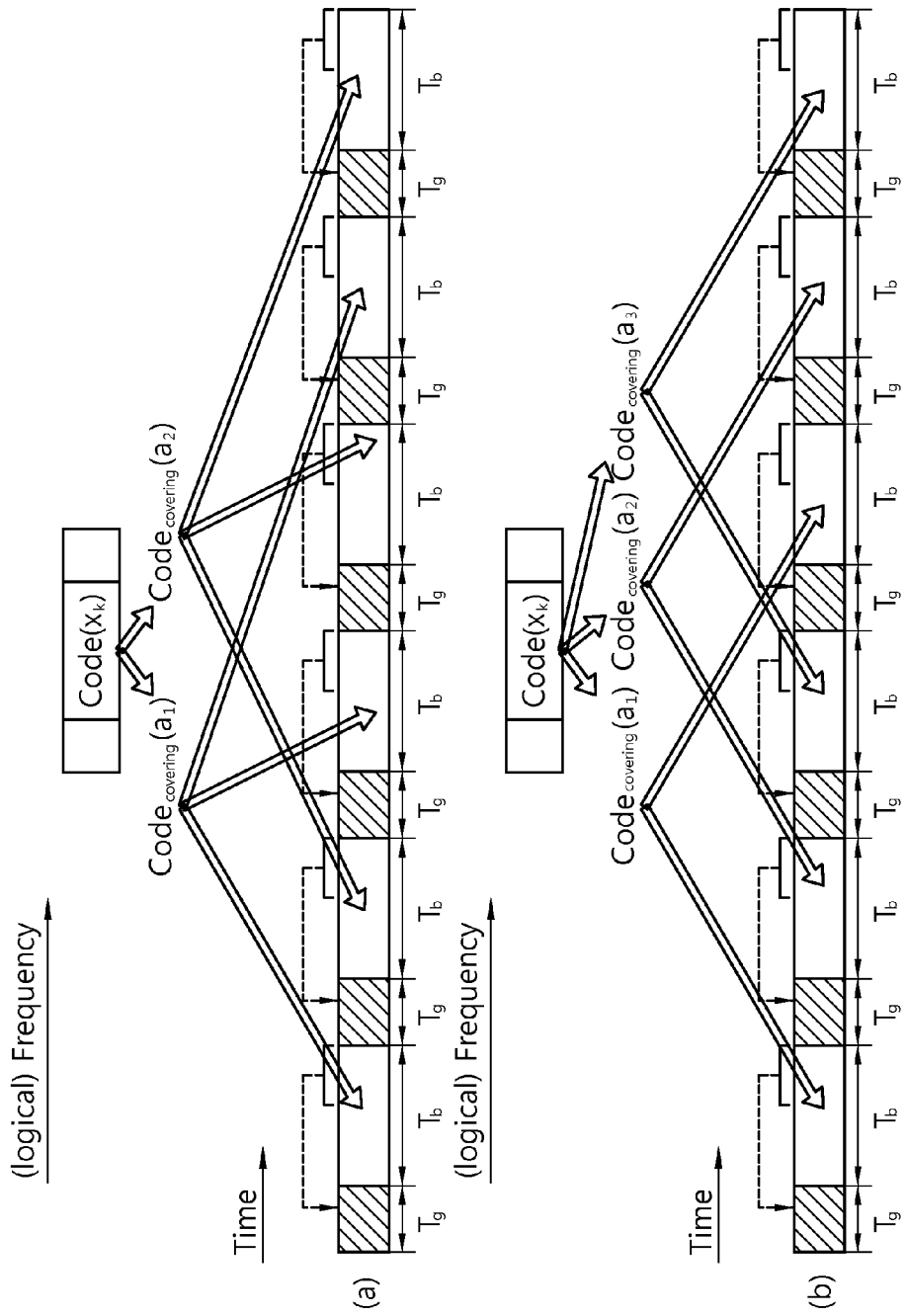
FIG. 16 shows another example of a ranging channel structure according to the proposed method of generating a ranging signal.

FIG. 16 shows another example of a ranging channel structure according to the proposed method of generating a ranging signal.

In FIG. 16(a), a ranging channel occupies one OFDMA symbol and includes a basic structure. The basic structure uses Code ($x_k$) as a ranging preamble code, and it is repeated six times. [$a_1$ $a_2$] having a length of 2 is used as a covering code, which is repeated three times. That is, a ranging code in which the Code ($x_k$) is multiplied by $Code_{covering}$ ($a_1$) is mapped to first, third, and fifth OFDMA symbols, and a ranging code in which the Code ($x_k$) is multiplied by $Code_{covering}$ ($a_2$) is mapped to second, fourth, and sixth OFDMA symbols. In FIG. 16(b), [$a_1$ $a_2$ $a_3$] having a length of 3 is used as a covering code, which is repeated twice. That is, a ranging code in which the Code ($x_k$) is multiplied by $Code_{covering}$ ($a_1$) is mapped to first and fourth OFDMA symbols, a ranging code in which the Code ($x_k$) is multiplied by $Code_{covering}$ ($a_2$) is mapped to second and fifth OFDMA symbols, and a ranging code in which the Code ($x_k$) is multiplied by $Code_{covering}$ ($a_3$) is mapped to third and sixth OFDMA symbols. If, as in FIG. 16, the length of the covering code is shorter than the number of repetitions of a basic structure and a covering code is repeated twice or more, the breakdown of orthogonality resulting from a fading channel can be prevented.

Figure 17:
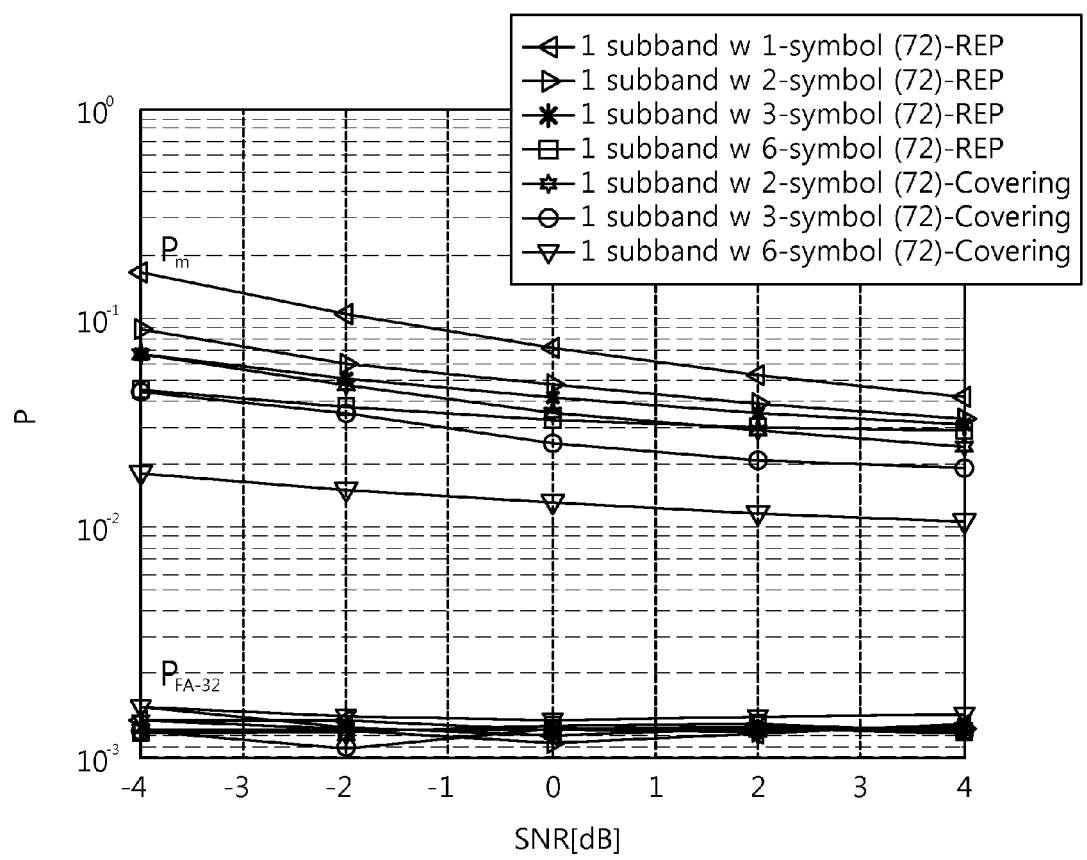
FIG. 17 shows a miss-detection probability Pm and a false alarm probability PFA according to the Signal-to-Noise Ratio (SNR) in various ranging channel structures.

FIG. 17 is a graph showing the detection performance of a ranging signal in the case in which a ranging channel structure according to the proposed method of generating a ranging signal is used.

In an experimental environment, a frame structure and an OFDMA symbol structure in which Tg of an IEEE 802.16m system was 1/8*Tb was used, a bandwidth was 5 MHz, and the number of subcarriers used was 72. That is, the length of a basic code was also 72. It was assumed that a user equipment was a pedestrian who walks at the rate of 3 km/h. A padded ZC sequence was used as the basic code, and a DFT code was used as a covering code.

Tables 2 to 4 show examples of the covering codes used according to the number of repetitions. Table 2 shows an example of the covering code having a length of 2 in the case in which the basic structure was repeated twice.

TABLE 2

| $a_1$ | $a_2$ |
|---|---|
| 1 | 1 |
| 1 | −1 |

Table 3 shows an example of the covering code having a length of 3 in the case in which the basic structure was repeated three times.

TABLE 3

| $a_1$ | $a_2$ | $a_3$ |
|---|---|---|
| 1 | 1 | 1 |
| 1 | −0.5 + 0.866i | −0.5 − 0.866i |
| 1 | −0.5 − 0.866i | −0.5 + 0.866i |

Table 4 shows an example of the covering code having a length of 6 in the case in which the basic structure was repeated six times.

TABLE 4

| $a_1$ | $a_2$ | $a_3$ | $a_4$ | $a_5$ | $a_6$ |
|---|---|---|---|---|---|
| 1 | 1 | | 1 | 1 | 1 |
| 1 | 0.5 + 0.866i | −0.5 + 0.866i | −1 | −0.5 − 0.866i | 0.5 − 0.866i |
| 1 | −0.5 + 0.866i | −0.5 − 0.866i | 1 | −0.5 + 0.866i | −0.5 − 0.866i |
| 1 | −1 | 1 | −1 | 1 | −1 |
| 1 | −0.5 − 0.866i | −0.5 + 0.866i | 1 | −0.5 − 0.866i | −0.5 + 0.866i |
| 1 | 0.5 − 0.866i | −0.5 − 0.866i | −1 | −0.5 + 0.866i | 0.5 + 0.866i |

The number of codes available within a cell is 32. In the case in which the basic structure is repeated twice, 16 different basic codes can be used by taking the number of covering codes (i.e., 2) into consideration. In the case in which the basic structure is repeated three times, 11 different basic codes can be used by taking the number of covering codes (i.e., 3) into consideration. The last one code of 33 codes which can be generated is not used. In the case in which the basic structure is repeated six times, 6 different basic codes can be used by taking the number of covering codes (i.e., 6) into consideration. The last four codes of 36 codes which can be generated are not used. Further, it is assumed that one base station has one transmission antenna and one user equipment has two reception antennas. The user equipment selects and transmits any one of available 32 ranging codes, and the base station detects all the available 32 ranging codes. It is assumed that propagation delay is less than a CP length.

FIG. 17 shows a miss-detection probability Pm and a false alarm probability $P_{FA}$ according to the Signal-to-Noise Ratio (SNR) in various ranging channel structures. The miss-detection probability indicates a probability that a code transmitted may not be detected, and a target miss-detection probability is 1%. The false alarm probability indicates a probability that a code not transmitted may be detected, and a target false alarm probability is 0.1%. In FIG. 17, the term 'x-symbol' indicates an x-times repetition structure, REP indicates a ranging channel structure in which the basic code is simply repeated, and Covering indicates a ranging channel structure to which a ranging code multiplied by a covering code is applied to the basic code.

From FIG. 17, it can be seen that the performance of a base station detecting a ranging signal is improved when a ranging channel structure using a covering code as compared with when a ranging channel structure in which a basic code is simply repeated is used. This is because a crossing correlation value is decreased when the covering code is used. In the case in which the simple repetition structure is used, a cross correlation value exists between all available basic codes. However, in the case in which the covering code is used, a ranging code multiplied by a covering code on the basis of the same basic code is used and thus a cross correlation value between the same basic codes becomes 0. That is, as the number of ranging codes distinguished from each other by a covering code is increased, the performance of a base station detecting a ranging signal is increased, and thus the detection performance is increased with a decrease in the number of basic codes.

Figure 18:
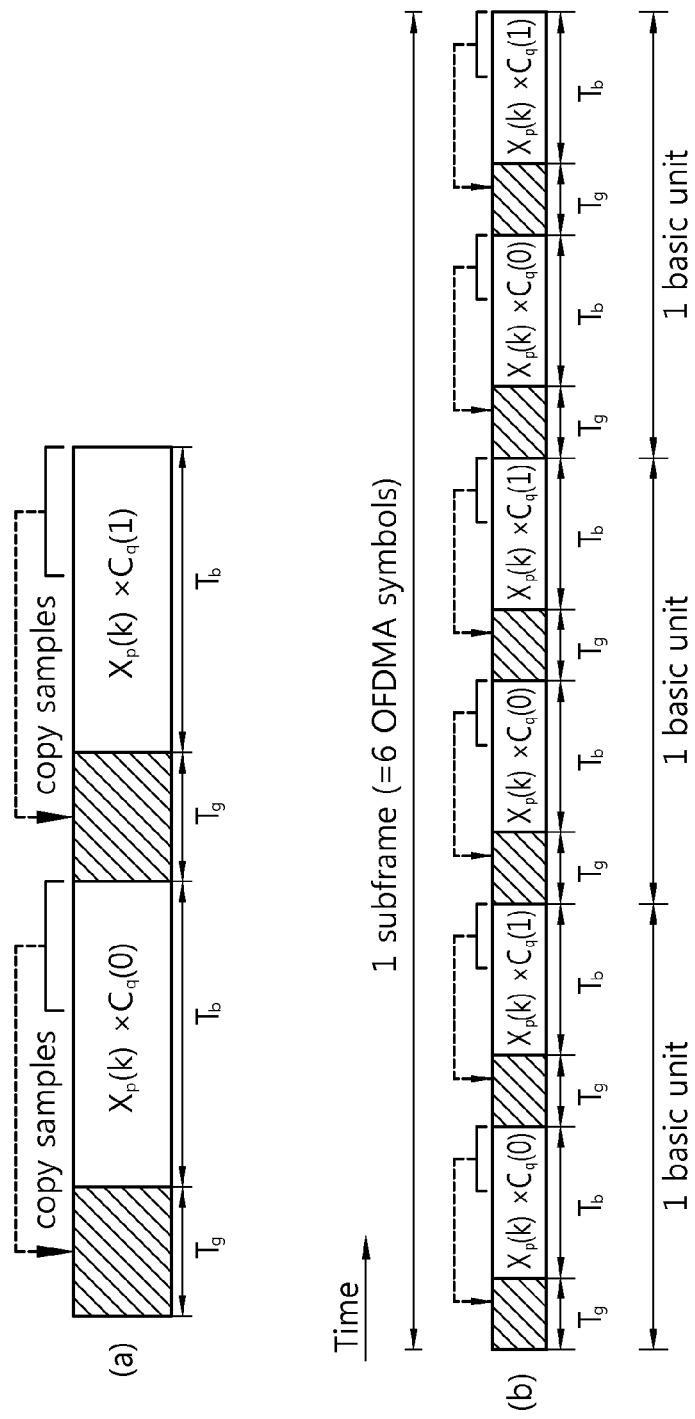
FIG. 18 shows another example of a ranging channel structure according to the proposed method of generating a ranging signal.

FIG. 18 shows another example of a ranging channel structure according to the proposed method of generating a ranging signal.

FIG. 18(a) shows a basic structure constituting a ranging channel. The basic structure can start from the first OFDMA symbol of a subframe, and it can be repeated K/2 times. Here, K is a maximum even number which is equal to or smaller than the number of OFDMA symbols within the subframe. In a femtocell, a K/2 number of basic structures simply exist within a subframe without the repetition of the basic structure. In a common cell, all basic structures within a subframe are transmitted by a user equipment in order to increase the reception energy of a base station. In a femtocell, only one basic structure is transmitted by a user equipment, and the remaining basic structures can be basic structures for an additional opportunity in contention-based ranging. In FIG. 18(a), a basic structure includes two OFDMA symbols, $x_p(k)$ is used as a basic code, and Cq(n) is used as a covering code. $x_p(k)*Cq(0)$ is mapped to the first OFDMA symbol, and $x_p(k)*Cq(1)$ is mapped to the second OFDMA symbol. Tg indicates a CP length, and Tb indicates a useful symbol time. In FIG. 18(b), a basic structure is repeated three times, thereby constituting a ranging subframe including 6 OFDMA symbols.

A padded ZC sequence to which a cyclic shift of Equation 9 has been applied can be used as the basic code.

$$x_p(k) = \exp\left(-j \cdot \pi \frac{r_p k(k+1) + 2 \cdot k \cdot s_p \cdot N_{CS}}{N_{RP}}\right), \quad \text{[Equation 9]}$$
$$k = 0, 1, \ldots, N_{RP} - 1$$

where p is the index of a ranging preamble code which is determined by a cyclic shift of $s_p$ times from the padded ZC sequence in which a root index is $r_p$. $r_p$ and $s_p$ can be defined by Equation 10.

$$\left.\begin{array}{l} r_p = \mathrm{mod}((1 - 2 \cdot \mathrm{mod}(\lfloor p/M \rfloor, 2)) \cdot \\ \quad (\lfloor p/M/2 \rfloor + r_0), N_{RP}) \\ s_p = \mathrm{mod}(p, M) \end{array}\right\} \quad \text{[Equation 10]}$$
$$p = 0, 1, \ldots, N_{TOTAL}/2 - 1$$

A $p^{th}$ ranging preamble code is determined by a root index $r_p$, determined by a start root index $r_0$, and an $S_p^{th}$ cyclic shift. $M = \lfloor N_{RP}/N_{CS} \rfloor$. $N_{TOTAL}$ is a total number of ranging preamble codes of a periodic ranging channel for every sector and can be determined by Table 5.

TABLE 5

| | Index | | | |
|---|---|---|---|---|
| | 0 | 1 | 2 | 3 |
| Number of periodic ranging preamble codes $N_{PE}$ | 8 | 16 | 24 | 32 |

$N_{CS}$ is the unit of a cyclic shift according to a cell size in the time domain and can be defined as $N_{CS} = \lceil 2 \cdot G \cdot N_{RP} \rceil$. G is a CP ratio. $N_{RP}$ is the length of a ranging preamble code and can be defined as the length of a ZC sequence to which 1 is added. Here, $N_{RP} = 72$.

The $r_0$ and information about the ranging preamble code can be broadcasted through an SFH. The $r_0$ can be represented by $r_0=2*k+1$. k is a cell-specific value which can be broadcasted through an S-SFH. The information about the ranging preamble code indicates the number of ranging preamble codes of the periodic ranging channel shown in Table 5.

A Discrete Fourier Transform (DFT) code or Walsh code having a length of 2 can be used as the covering code. The covering code used in the ranging channel structure of FIG. 18 can be defined by Table 6.

TABLE 6

|  | OFDMA symbol index within a basic unit n | |
|---|---|---|
| $C_q(n)$ | 0 | 1 |
| Covering code index q   0 | 1 | 1 |
|                         1 | 1 | −1 |

For a femtocell, a user equipment randomly selects one of a K/2 number of basic structures within a subframe allocated thereto. In a common cell, a user equipment randomly selects one of the two covering codes of Table 6 in each code opportunity of contention-based ranging. That is, any one of q=0 and 1 is selected. Next, the user equipment selects any one of ranging preamble codes, multiplies the selected ranging preamble codes by the selected covering code, and maps the multiplication result to a ranging subframe.

Meanwhile, a method of multiplexing uplink control channels other than the proposed method of generating a ranging signal can be proposed. The proposed method of multiplexing uplink control channels can be used irrespective of whether the method of generating a ranging signal is used. In the following description, a repetition structure channel refers to a channel in which a basic structure is repeated irrespective of whether a covering code is used. Further, in the case in which a basic structure is transmitted according to predetermined regulations in each repetition period, the repetition structure channel can be referred to as a channel having a repetition structure.

The length of a repetition structure channel in the time domain can be smaller than a basic resource allocation unit. In this case, resources of portions remain after the repetition structure channel is allocated can be wasted. For example, if the basic resource allocation unit is 6 OFDMA symbols in a frame structure having a CP length of Tg=1/8*Tb, but the repetition structure channel occupies 2 OFDMA symbol, resources remain within the basic resource allocation unit. Meanwhile, a frame structure including 5 or 7 OFDMA symbols also exists in an IEEE 802.16m system, in addition to a frame structure including 6 OFDMA symbol. Accordingly, uplink control channels having a repetition structure can be multiplexed so that resources remaining within a basic resource allocation unit can be efficiently used.

Figure 19:
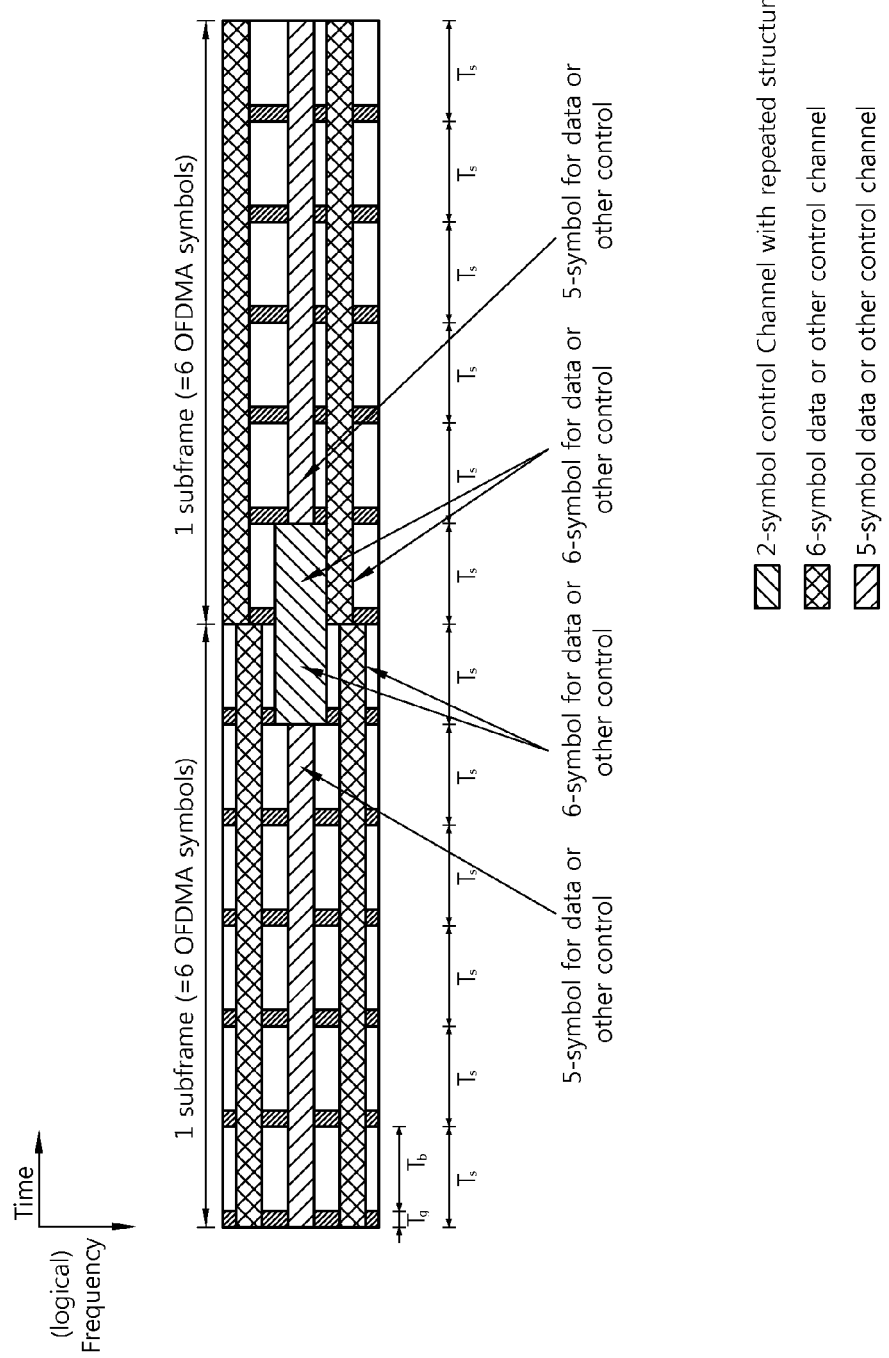
FIG. 19 to FIG. 20 shows an example in which repetition structure channels are multiplexed.

FIG. 19 shows an example in which repetition structure channels are multiplexed. An uplink control channel, having a repetition structure and including 2 OFDMA symbols, is allocated to neighboring subframes. Accordingly, the uplink control channel occupies only one OFDMA symbol of one subframe. In the subframe, the remaining regions to which the uplink control channel has not been mapped can be allocated to data or other control channels using the remaining 5 OFDMA symbols as a basic resource allocation unit. That is, it can be seen that the 5 OFDMA symbols constitute a new subframe. The new subframe including the 5 OFDMA symbols can use the construction of a subframe, including 5 OFDMA symbols in the existing frame structure, without change. A frequency domain to which the uplink control channel has not been allocated can be allocated to data or other control channels using the original 6 OFDMA symbols as a basic resource allocation unit. In some cases, in order to reduce the complexity of a system, if an uplink control channel including a repetition structure is included, a basic resource allocation unit including 5 OFDMA symbols in the entire frequency domain can be allocated to data or other control channels. The consumption of resources can be reduced by multiplexing repetition structure channels over neighboring subframes in the time domain as described above.

Figure 20:
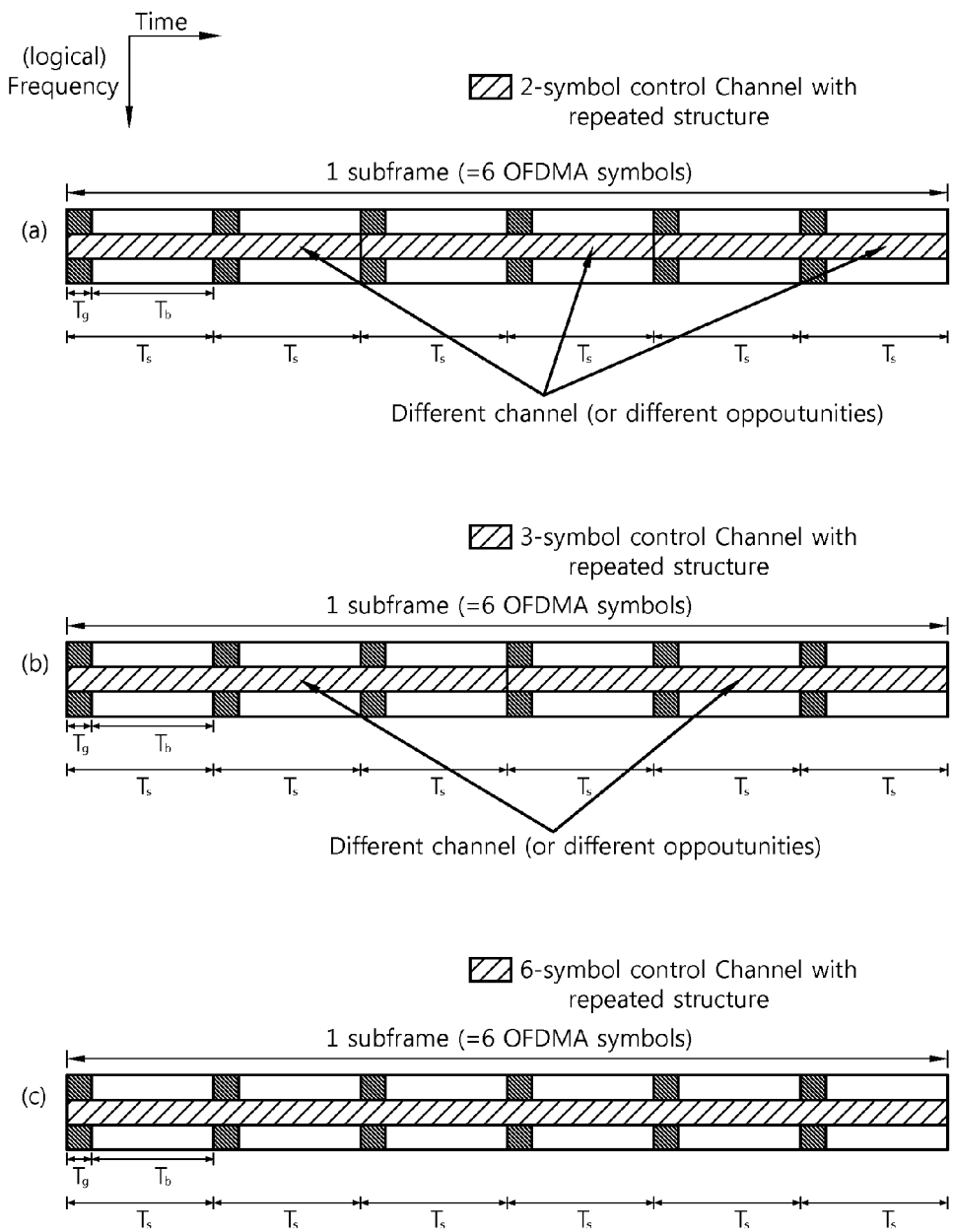

FIG. 20 shows another example in which repetition structure channels are multiplexed. A plurality of the repetition structure channels can be allocated within a basic resource allocation unit. In FIG. 20(a), three second repetition structures are allocated within a basic resource allocation unit including 6 OFDMA symbols. The repetition structures indicate different channels or different opportunities. It can be seen that a plurality of repetition structure channels is allocated to a user equipment within the basic resource allocation unit. Since the plurality of repetition structure channels is allocated within the basic resource allocation unit, a code opportunity that the plurality of repetition structure channels is randomly selected by the user equipment can be increased.

In FIG. 20(b), two third repetition structures are allocated within the basic resource allocation unit. In FIG. 20(c), one sixth repetition structure is allocated within the basic resource allocation unit. That is, in FIG. 20(c), the basic resource allocation unit and the repetition structure channel have the same length.

Figure 21:
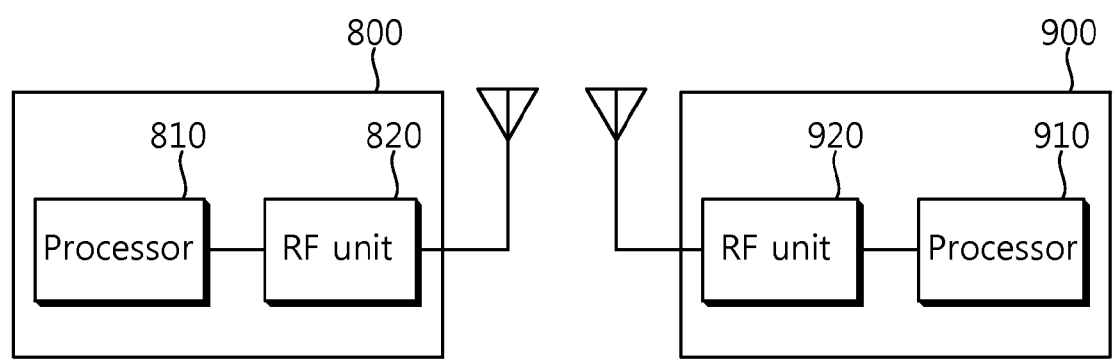
FIG. 21 is a block diagram showing a base station and a user equipment in which the embodiments of the present invention are implemented.

FIG. 21 is a block diagram showing a base station and a user equipment in which the embodiments of the present invention are implemented.

The base station 800 includes a processor 810 and a Radio Frequency (RF) unit 820. The processor 810 implements the proposed functions, processes, and/or methods. The processor 810 processes a received ranging signal. The layers of a wireless interface protocol can be implemented by the processor 810. The RF unit 820 is coupled to the processor 810 and is configured to transmit and/or receive a radio signal and receive a ranging signal.

The user equipment 900 includes a processor 910 and an RF unit 920. The processor 910 implements the proposed functions, processes, and/or methods. The processor 910 generates a ranging code to which a covering code has been applied for each of a plurality of OFDMA symbols, maps the ranging code to a plurality of subcarriers constituting each of the OFDMA symbols, and generates a ranging signal by performing OFDMA modulation on each of the OFDMA symbols. The layers of a radio interface protocol can be implemented by the processor 910. The RF unit 920 is connected to the processor 910 and is configured to transmit and/or receive a radio signal and transmit the generated ranging signal.

In the time domain, a covering code is used. Accordingly, the number of basic codes used in a ranging preamble code can be reduced. Further, since repetition structures are multiplexed in the time domain, physical resources can be efficiently used.

The present invention can be implemented using hardware, software, or a combination of them. In the hardware implementations, the present invention can be implemented using an application specific integrated circuit (ASIC), a digital signal processor (DSP), a programmable logic device (PLD), a field programmable gate array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of generating a ranging signal in a wireless communication system, the method comprising:
generating a ranging code in which a covering code has been applied to each of a plurality of orthogonal frequency division multiple access (OFDMA) symbols;
mapping the ranging code to a plurality of subcarriers comprising each of the OFDMA symbols; and
generating the ranging signal by performing OFDMA modulation on the OFDMA symbols,
wherein generating the ranging code comprises multiplying a ranging preamble code by the covering code in a time domain or a frequency domain.

2. The method of claim 1, wherein the covering code is a Discrete Fourier Transform (DFT) code or a Walsh code.

3. The method of claim 1, wherein the covering code has a length of 2.

4. The method of claim 3, wherein the covering code is either [1 1] or [1 -1].

5. The method of claim 1, further comprising repeatedly applying the covering code to the plurality of OFDMA symbols.

6. The method of claim 1, wherein a number of the plurality of OFDMA symbols is 6.

7. The method of claim 1, wherein the ranging code has a length of 72.

8. The method of claim 1, wherein the OFDMA modulation is either performed on all of the plurality of OFDMA symbols or repeatedly performed on a number of OFDMA symbols the number of which is identical to a length of the covering code.

9. An apparatus for transmitting a ranging signal in a wireless communication system, the apparatus comprising:
a Radio Frequency (RF) unit configured to transmit or receive a radio signal and transmit the ranging signal; and
a processor coupled to the RF unit, and configured to:
generate a ranging code in which a covering code has been applied to each of a plurality of OFDMA symbols,
map the ranging code to a plurality of subcarriers comprising each of the OFDMA symbols, and
generate the ranging signal by performing OFDMA modulation on the OFDMA symbols.

10. The apparatus of claim 9, wherein the covering code has a length of 2.

11. The apparatus of claim 10, wherein the covering code is either [1 1] or [1 -1].

12. The apparatus of claim 9, wherein the covering code is repeatedly applied to the plurality of OFDMA symbols.

13. The apparatus of claim 9, wherein a number of the plurality of OFDMA symbols is 6.

* * * * *